(12) United States Patent
Matsumoto et al.

(10) Patent No.: US 8,431,270 B2
(45) Date of Patent: Apr. 30, 2013

(54) COMPOSITE GRAPHITE PARTICLES FOR NONAQUEOUS SECONDARY BATTERY, NEGATIVE-ELECTRODE MATERIAL CONTAINING THE SAME, NEGATIVE ELECTRODE, AND NONAQUEOUS SECONDARY BATTERY

(75) Inventors: Hitoshi Matsumoto, Kagawa (JP); Hideharu Sato, Ibaraki (JP); Hiroyuki Uono, Ibaraki (JP); Keita Yamaguchi, Kagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 695 days.

(21) Appl. No.: 12/521,372

(22) PCT Filed: Dec. 25, 2007

(86) PCT No.: PCT/JP2007/074855
§ 371 (c)(1),
(2), (4) Date: Nov. 16, 2009

(87) PCT Pub. No.: WO2008/084675
PCT Pub. Date: Jul. 17, 2008

(65) Prior Publication Data
US 2010/0086856 A1 Apr. 8, 2010

(30) Foreign Application Priority Data
Dec. 26, 2006 (JP) .............................. P. 2006-348703

(51) Int. Cl.
*H01M 4/13* (2010.01)
*H01M 4/60* (2006.01)
*H01M 4/58* (2010.01)

(52) U.S. Cl.
USPC ........ 429/212; 429/213; 429/215; 429/231.8; 252/502

(58) Field of Classification Search ................... 429/212, 429/213, 215, 231.8; 423/448; 252/502
See application file for complete search history.

(56) References Cited

U.S. PATENT DOCUMENTS

2004/0151837 A1  8/2004  Morita et al.
2005/0266314 A1* 12/2005  Sheem et al. .............. 429/231.8
(Continued)

FOREIGN PATENT DOCUMENTS

CN  1091072 C  9/2002
JP  10 334915  12/1998
(Continued)

OTHER PUBLICATIONS

U.S. Appl. No. 11/574,423, filed Dec. 24, 2008, Onishi, et al.
(Continued)

*Primary Examiner* — Patrick Ryan
*Assistant Examiner* — Julian Anthony
(74) *Attorney, Agent, or Firm* — Oblon, Spivak, McClelland, Maier & Neustadt, L.L.P.

(57) ABSTRACT

A subject is to provide a nonaqueous secondary battery which is sufficiently low in charge/discharge irreversible capacity in initial cycling even when an active-material layer comprising a negative-electrode material and formed on a current collector is densified for capacity increase where the subject is accomplished with composite graphite particles for a nonaqueous secondary battery which comprise a composite of spherical graphite particles and a binder graphite and which satisfy at least one of (a) to (g) conditions as presently claimed and a negative electrode produced using the carbonaceous negative-electrode material according to the invention is excellent in electrolytic-solution infiltration and provides a nonaqueous secondary battery having excellent charge/discharge high-load characteristics.

26 Claims, 3 Drawing Sheets

U.S. PATENT DOCUMENTS

| | | |
|---|---|---|
| 2006/0062717 A1* | 3/2006 | Tokuoka et al. .............. 423/448 |
| 2006/0133980 A1 | 6/2006 | Nanba et al. |
| 2008/0199777 A1 | 8/2008 | Onishi et al. |
| 2009/0130561 A1 | 5/2009 | Matsumoto et al. |
| 2009/0136849 A1* | 5/2009 | Yue et al. ................... 429/231.8 |

FOREIGN PATENT DOCUMENTS

| | | |
|---|---|---|
| JP | 11 11918 | 1/1999 |
| JP | 2000 86343 | 3/2000 |
| JP | 2005 19397 | 1/2005 |
| JP | 2005 123179 | 5/2005 |
| JP | 2005 149792 | 6/2005 |
| WO | 97 18160 | 5/1997 |

OTHER PUBLICATIONS

Office Action issued on Jan. 27, 2011 in the corresponding Chinese Application No. 200780047592.0 (with English Translation).

Office Action issued Aug. 29, 2012, in JP Patent Application No. 2007-332689 with English Language Translation.

* cited by examiner

COMPOSITE GRAPHITE PARTICLES FOR NONAQUEOUS SECONDARY BATTERY, NEGATIVE-ELECTRODE MATERIAL CONTAINING THE SAME, NEGATIVE ELECTRODE, AND NONAQUEOUS SECONDARY BATTERY

TECHNICAL FIELD

The present invention relates to composite graphite particles for use in nonaqueous secondary batteries, a negative-electrode material containing the composite graphite particles, a negative electrode formed using the negative-electrode material, and a nonaqueous secondary battery having the negative electrode. More particularly, the invention relates to composite graphite particles having a high capacity and capable of attaining a low charge/discharge irreversible capacity and to a negative-electrode material, negative electrode, and nonaqueous secondary battery. The negative electrode produced using the carbonaceous negative-electrode material according to the invention is excellent in electrolytic-solution infiltration thereinto. This negative electrode can hence improve the productivity of nonaqueous secondary batteries and gives a nonaqueous secondary battery having excellent charge/discharge high-load characteristics.

BACKGROUND ART

With the recent trend toward size reduction in electronic appliances, the desire for secondary batteries having a high capacity is growing. In particular, nonaqueous secondary batteries having a higher energy density and better high-current charge/discharge characteristics than nickel-cadmium batteries and nickel-hydrogen batteries have come to attract attention.

Graphite is frequently used as a negative-electrode material for nonaqueous secondary batteries from the standpoints of cost, durability, and capacity. However, there has been a problem that when an active-material layer containing a negative-electrode material and formed on an electrode is densified in order to increase capacity, this densification results in an increased charge/discharge irreversible capacity in initial cycling.

Patent document 1 describes a process for producing a carbon composite material which includes kneading a natural graphite together with a binder to obtain a mixture, primarily heating the mixture at 700-1,500° C. to carbonize the binder, and then secondarily heating the mixture at 2,400-3,000° C. to thereby purify the natural graphite and simultaneously graphitize the carbonized binder. However, the technique disclosed in patent document 1, which is intended to use a flaky or scale-like natural graphite as a starting material, has been insufficient in the densification of an active-material layer and in reduction in charge/discharge irreversible capacity.
Patent Document 1: JP-A-2000-086343

It is expected that the densification of an active-material layer containing a negative-electrode material eliminates most of the interstices present in the electrode, resulting in poor infiltration of an electrolytic solution thereinto. It is thought that the poor electrolytic-solution infiltration renders the migration of lithium ions within the electrode not smooth to cause a deficiency in the electrolytic solution and an uneven potential distribution, leading to a decrease in charge/discharge high-load characteristics.

DISCLOSURE OF THE INVENTION

Problems that the Invention is to Solve

The invention has been achieved in view of those background techniques. An object of the invention is to provide a nonaqueous secondary battery which has a sufficiently low charge/discharge irreversible capacity in initial cycling and excellent charge/discharge high-load characteristics even when the active-material layer including a negative-electrode material and formed on a current collector has been densified for capacity increase.

Means for Solving the Problems

The present inventors diligently made investigations in order to eliminate those problems. As a result, it has been found that a nonaqueous secondary battery free from those problems is obtained by using, as a negative active material, composite graphite particles which are constituted of spherical graphite particles and a binder graphite combined therewith and which have a specific structure and specific properties. The invention has been thus achieved.

Namely, the invention provides composite graphite particles for a nonaqueous secondary battery, which comprise a composite of spherical graphite particles and a graphitized product of a graphitizable binder, and satisfy any requirement selected from the group consisting of the following requirements (a), (b), (c), (d), (e), (f), and (g):

(a) the composite graphite particles include composite graphite particles in which at least part of the spherical graphite particles is exposed at the surface thereof;

(b) the composite graphite particles include composite graphite particles which have an imperfect laminate structure of the spherical graphite particles near the surface thereof;

(c) when the median diameter of the spherical graphite particles and the median diameter of the composite graphite particles are expressed by a and b, respectively, then the ratio $c=a/b$ is 0.93 or larger;

(d) the composite graphite particles have a Raman R value of from 0.10 to 0.30, an average degree of circularity of 0.85 or higher, a tap density of from 0.87 g/cm$^3$ to 1.25 g/cm$^3$, and a BET specific surface area of from 2.5 m$^2$/g to 8.0 m$^2$/g;

(e) a volume of pores ranging from 0.01 μm to 2 μm, as measured with a mercury porosimeter, is from 0.05 mL/g to 1 mL/g;

(f) the amount of CO groups present on the surface normalized with the BET specific surface area is from 1.15 μmol/m$^2$ to 5 μmol/m$^2$; and (g) when an electrode is produced by preparing a slurry using the composite graphite particles under the following condition (i), subsequently applying the slurry to a rolled copper foil by a doctor blade method, drying the coating, and then pressing the dried coating so as to result in an active-material layer density of 1.70 g/cm$^3$, and 5-μL drops of an electrolytic solution having the following composition (ii) are put from a height of 5 cm onto a longitudinal central part of the electrode, then the average time period required for the electrolytic solution to disappear completely from the electrode surface is 180 seconds or shorter.

(i) Slurry Preparation Condition

A 20.00±0.02 g of the composite graphite particles, 20.00±0.02 g of 1% by mass aqueous carboxymethyl cellulose (CMC) solution, and 0.25±0.02 g of an aqueous styrene/butadiene rubber (SBR) dispersion are weighed out and manually stirred, and the resultant mixture is stirred with a planetary rotary mixer (hybrid mixer) for 5 minutes and defoamed for 30 seconds to prepare the slurry.

(ii) Composition of Electrolytic Solution $LiPF_6$ is incorporated in a concentration of 1.0 M into a mixed solvent composed of ethylene carbonate (EC), ethyl methyl carbonate (EMC), and dimethyl carbonate (DMC) (volume ratio=2:2:3), and 2% by volume of vinylene carbonate is further added thereto.

The invention further provides composite graphite particles for nonaqueous secondary batteries, the composite graphite particles being ones obtained by conducting the "composite of spherical graphite particles with a graphitized product of a graphitizable binder" by "kneading spherical graphite particles together with a graphitizable binder and then graphitizing the mixture" and characterized by satisfying any requirement selected from the group consisting of the requirements (a), (b), (c), (d), (e), (f), and (g) described above.

The invention furthermore provides a negative-electrode material for nonaqueous secondary batteries which is characterized by including the composite graphite particles for nonaqueous secondary batteries. The invention still further provides the negative-electrode material for nonaqueous secondary batteries which is characterized by further containing carbonaceous particles differing in shape or property from the composite graphite particles for nonaqueous secondary batteries, preferably containing carbonaceous particles of one or more kinds selected from the group consisting of natural graphites, artificial graphites, amorphous-substance-coated graphites, resin-coated graphites, and amorphous carbon.

The invention still further provides a negative electrode for nonaqueous secondary batteries which comprises a current collector and an active-material layer formed thereon and is characterized in that the active-material layer has been formed using the negative-electrode material for nonaqueous secondary batteries.

The invention still further provides a nonaqueous secondary battery which includes a positive electrode capable of occluding/releasing lithium ions, a negative electrode capable of occluding/releasing lithium ions, and an electrolyte, and is characterized in that the negative electrode is the negative electrode for nonaqueous secondary batteries.

Advantages of the Invention

When the composite graphite particles for nonaqueous secondary batteries of the invention are used, a nonaqueous secondary battery can be provided which has a low charge/discharge irreversible capacity in initial cycling even when the active-material layer on the current collector of the negative electrode has been densified, and which has a high capacity and excellent charge/discharge high-load characteristics.

BEST MODE FOR CARRYING OUT THE INVENTION

Figure 1:
FIG. 1 is examples of SEM photographs (magnification: 1,000 diameters each) of composite graphite particles of the invention for nonaqueous secondary batteries; parts satisfying requirement (a) or requirement (b) each are indicated by a circle or ellipse.
Figure 1:
Figure 1:
Figure 1:
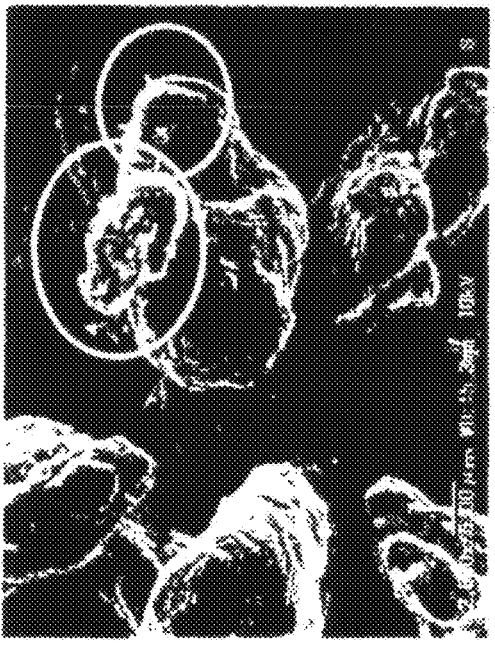
Figure 2:
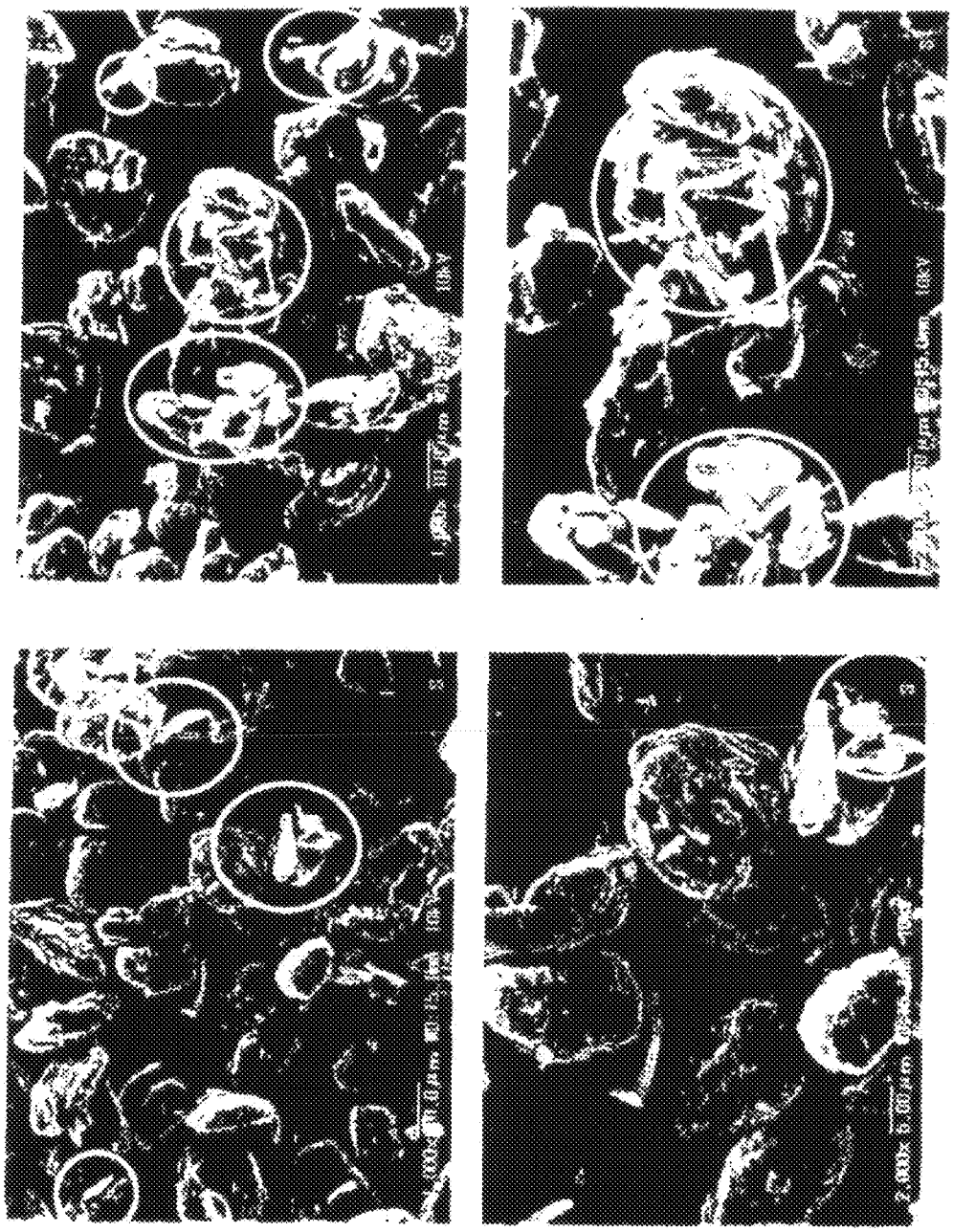
FIG. 2 is examples of SEM photographs (magnification: 1,000 diameters each) of composite graphite particles of the invention for nonaqueous secondary batteries; parts satisfying requirement (a) or requirement (b) each are indicated by a circle or ellipse.
Figure 3:
FIG. 3 is an example of SEM photographs (magnification: 1,000 diameters) of composite graphite particles of the invention for nonaqueous secondary batteries; a part satisfying requirement (a) or requirement (b) is indicated by a circle or ellipse.

Best modes for carrying out the invention will be explained below in detail. The following explanations on constituent elements of the invention are for embodiments (typical embodiments) of the invention, and the invention should not be construed as being limited to the embodiments unless the invention departs from the spirit thereof.

In the invention, the definition and usage of several terms are as follows. In the composite graphite particles of the invention, the part formed by burning carbonaceous particles is sometimes referred to as graphitic particles. The carbonaceous composite particles of the invention and the particles including carbonaceous particles mixed therewith according to need are inclusively defined as a negative-electrode material. At least a negative-electrode material and a binder are used to obtain an active-material layer, and a current collector for negative electrodes which has at least an active-material layer formed thereon is defined as an electrode plate or negative electrode. A nonaqueous secondary battery is constituted at least of a negative electrode, a positive electrode, and an electrolyte.

[1] Composite Graphite Particles for Nonaqueous Secondary Battery (A) Constitution of the Composite Graphite Particles The negative-electrode material of the invention includes the composite graphite particles of the invention as a main component. The composite graphite particles of the invention are obtained, for example, by a method in which spherical graphite particles are kneaded together with a graphitizable binder (hereinafter sometimes referred to simply as "binder") and a molding of the resultant mixture is pulverized and then graphitized or is graphitized and then pulverized or ground. Namely, the composite graphite particles formed in this case have a constitution in which the graphitic particles obtained by burning carbonaceous particles have been combined at least partly (partly or wholly) with a substance formed by burning the binder (that substance also is graphitic).

The carbonaceous particles as a raw material for the composite graphite particles of the invention are not particularly limited so long as the carbonaceous particles are particles of carbon which can be graphitized by burning. Examples thereof include natural graphites, artificial graphites, rounded graphites, coke powders, needle coke powders, and powders of carbonized resins. It is preferred to use natural graphites among these materials from the standpoint of ease of heightening the density of an active-material layer during the formation of the active-material layer. Especially preferred of these is a rounded graphite obtained by subjecting a graphite to a rounding treatment. The spherical graphite particles in the invention preferably are ones each composed of curved or bent particles of a scale-like or flaky graphite.

The graphitizable binder is not particularly limited so long as the binder is a carbonaceous substance capable of being graphitized by burning. Preferred are petroleum-derived and coal-derived, fused-ring aromatics including tar and pitches ranging from soft pitch to hard pitch. Examples thereof include impregnation pitch, coal tar pitch, coal-derived heavy oils such as coal liquefaction oil, and petroleum-derived heavy oils such as straight-run heavy oils, e.g., asphaltene, and cracking heavy oils, e.g., ethylene-heavy end tar.

(B) Properties of the Composite Graphite Particles

The composite graphite particles of the invention satisfy at least any requirement selected from the group consisting of the following requirement (a) to requirement (g).

(a) The composite graphite particles include composite graphite particles in which at least part of the spherical graphite particles is exposed at the surface thereof.

(b) The composite graphite particles include composite graphite particles which have an imperfect laminate structure of the spherical graphite particles near the surface thereof.

(c) When the median diameter of the spherical graphite particles and the median diameter of the composite graphite particles are expressed by a and b, respectively, then the ratio c=a/b is 0.93 or larger.

(d) The composite graphite particles have a Raman R value of from 0.10 to 0.30, an average degree of circularity of 0.85 or higher, a tap density of from 0.87 $g/cm^3$ to 1.25 $g/cm^3$, and a BET specific surface area of from 2.5 $m^2/g$ to 8.0 $m^2/g$.

(e) a volume of pores ranging from 0.01 μm to 2 μm, as measured with a mercury porosimeter, is from 0.05 mL/g to 1 mL/g.

(f) The amount of CO groups present on the surface normalized with the BET specific surface area is from 1.15 $μmol/m^2$ to 5 $μmol/m^2$.

(g) When an electrode is produced by preparing a slurry using the composite graphite particles under the following condition (i), subsequently applying the slurry to a rolled copper foil by a doctor blade method, drying the coating, and then pressing the dried coating so as to result in an active-material layer density of 1.70 $g/cm^3$, and 5-μL drops of an electrolytic solution having the following composition (ii) are put from a height of 5 cm onto a longitudinal central part of the electrode, then the average time period required for the electrolytic solution to disappear completely from the electrode surface is 180 seconds or shorter.

(i) Slurry Preparation Condition

A 20.00±0.02 g of the composite graphite particles, 20.00±0.02 g of 1% by mass aqueous carboxymethyl cellulose (CMC) solution, and 0.25±0.02 g of an aqueous styrene/butadiene rubber (SBR) dispersion are weighed out and manually stirred, and the resultant mixture is stirred with a planetary rotary mixer (hybrid mixer) for 5 minutes and defoamed for 30 seconds to prepare the slurry.

(ii) Composition of Electrolytic Solution $LiPF_6$ is incorporated in a concentration of 1.0 M into a mixed solvent composed of ethylene carbonate (EC), ethyl methyl carbonate (EMC), and dimethyl carbonate (DMC) (volume ratio=2:2:3), and 2% by volume vinylene carbonate is further added thereto.

The composite graphite particles of the invention may simultaneously satisfy any two or more of those requirements. Preferably, the composite graphite particles simultaneously satisfy requirements (a) and (b), requirements (a) and (c), requirements (a) and (d), requirements (b) and (c), or requirements (b) and (d) among those requirements. The composite graphite particles more preferably simultaneously satisfy requirements (a) and (e), requirements (a) and (f), requirements (a) and (g), or requirements (d) and (e), and especially preferably simultaneously satisfy requirements (e) and (g), requirements (d) and (g), or requirements (c) and (d).

Those requirements are explained below in more detail.

(1) Requirement (a)

The composite graphite particles include composite graphite particles in which at least part of spherical graphite particles is exposed at the surface of the composite graphite particles.

The composite graphite particles of the invention for nonaqueous secondary batteries are ones obtained by combining spherical or ellipsoidal graphite particles formed from graphite particles as primary particles, and are in such a state that the spherical graphite particles have a roughly chipped surface due to the pulverization/grinding conducted during the production of the composite graphite particles. In FIG. 1 are shown photographs taken with a scanning electron microscope (hereinafter abbreviated to "SEM") of the composite graphite particles. As shown in the circles or ellipses in FIG. 1, the state satisfying requirement (a) means, for example, a state in which the spherical graphite particles at least partly have an exposed surface because of the pulverization/grinding conducted during the production of the composite graphite particles, a state in which sections formed by breakage due to the pulverization/grinding conducted during the production of the composite graphite particles have turned up and graphite particles in the spherical graphite particles have lifted up on the surface of the composite graphite particles, or a state in which that part of the spherical graphite particles in the composite graphite particles which have shed off due to the pulverization/grinding conducted during the production of the composite graphite particles are adherent to the surface of the composite graphite particles.

By the pulverization/grinding conducted during the production of the composite graphite particles, at least part of those graphite particles in the spherical graphite particles which are present in the surface of the composite graphite particles have been raised more than the graphite particles in the spherical graphite particles in a raw-material state before kneading and brought into the state described above. As a result, the infiltration of an electrolytic solution into the composite graphite particles is improved and the migration of lithium ions becomes smooth. Satisfactory suitability for charge is hence imparted. In addition, since the composite graphite particles have such a shape, an appropriate amount of interstices are ensured in the electrode after application and pressing, and electrolytic-solution infiltration into the electrode is improved.

(2) Requirement (b)

The composite graphite particles include composite graphite particles which have an imperfect laminate structure of spherical graphite particles near the surface of the composite graphite particles.

The term "imperfect laminate structure" means the state in which part of the spherical graphite particles have folded in various directions in the surface of the composite graphite particles. The composite graphite particles of the invention for nonaqueous secondary batteries have, for example, a state in which sections of graphite particles as primary particles of the spherical graphite particles used as a starting material have been oriented in various directions in the surface of the composite graphite particles due to the pulverization/grinding. This surface state renders the diffusion of lithium ions into inner parts of the particles smooth to thereby improve suitability for charge and also improve electrolytic-solution infiltration into the electrode plate, as described above under Requirement (a).

(3) Requirement (c)

When the median diameter of the spherical graphite particles and the median diameter of the composite graphite particles are expressed by a and b, respectively, then the ratio c=a/b is 0.93 or larger.

(a) Definition of "Median Diameter"

"Median diameter" is a volume-based diameter determined through particle size distribution analysis by the laser scattering method. This analysis method is as follows.

A 0.01 g portion of graphitic composite particles is suspended in 10 mL of a 0.2% by mass aqueous solution of polyoxyethylene sorbitan monolaurate (e.g., Tween 20 (registered trademark)) as a surfactant. This suspension is introduced into commercial laser diffraction/scattering type particle size analyzer "LA-920, manufactured by HORIBA", and an ultrasonic wave of 28 kHz is propagated thereto for 1 minute at an output of 60 W. Thereafter, a volume-based median diameter is measured with the analyzer. This value measured is defined as the volume-based median diameter (hereinafter abbreviated to "median diameter") $D_L$ μm in the invention.

(b) Definition of Median Diameter Ratio between Spherical Graphite Particles and Composite Graphite Particles In the invention, when the median diameter of the spherical graphite particles is expressed by a and the median diameter of the composite graphite particles is expressed by b, then the median diameter ratio c between these is defined by the following expression.

$$c=a/b$$

(c) Range

In the invention, the median diameter ratio c is preferably 0.93 or larger, more preferably 1.00 or larger. Although the composite graphite particles are obtained through the pulverization/grinding of spherical graphite particles as a raw material, there is a tendency that the median diameter of the composite graphite particles is made smaller relative to that of the spherical graphite particles by intensifying the pulverization/grinding. Under such conditions, at least part of the graphite particles in the surface of the composite graphite particles come into the state of having risen up (turned up) more than those in the spherical graphite particles in the raw-material state. This surface structure improves electrolytic-solution infiltration into the particles to render the migration of lithium ions smooth. Satisfactory suitability for charge is thus imparted.

(4) Requirement (d)

The composite graphite particles have a Raman R value of from 0.10 to 0.30, an average degree of circularity of 0.85 or higher, a tap density of from 0.87 g/cm$^3$ to 1.25 g/cm$^3$, and a BET specific surface area of from 2.5 m$^2$/g to 8.0 m$^2$/g.

The Raman R value (the definition and details thereof will be described later) of the composite graphite particles for nonaqueous secondary batteries in the invention is an important parameter indicating the crystallinity of the surface of the composite graphite particles. Lower values thereof tend to result in reduced crystallinity of the particle surface and in an increase in initial irreversible capacity, which develops in the beginning of charge/discharge, when an electrode produced is subjected to battery evaluation. When composite graphite particles having a low Raman R value are to be obtained, the result is a reduced yield. Such composite graphite particles are produced at the sacrifice of production efficiency. It is therefore necessary that a proper Raman R value should be possessed. On the other hand, the average degree of circularity, tap density, and BET specific surface area are important parameters indicating the shape of the composite graphite particles. In general, there is a tendency that particles having a low average degree of circularity have a low tap density and particles having a low tap density have a large specific surface area. In case where the composite graphite particles have a low average degree of circularity and a low tap density, the amount of interstices ensured in an electrode is reduced and, simultaneously therewith, the negative-electrode material slurry to be applied to a copper foil in producing a negative electrode has a reduced concentration. There is a high possibility that the reduced interstice amount and reduced slurry concentration might lead to impaired negative-electrode performance and impaired battery performance. It should, however, be noted that too high an average degree of circularity or too high a tap density results in a high possibility that fine particles might be present in a larger amount on the particle surface, leading to a decrease in productivity and impaired slurry applicability. It is therefore important that an average degree of circularity and a tap density which are in respective appropriate ranges should be possessed. Furthermore, large specific surface areas lead to an increase in initial irreversible capacity in charge/discharge. Consequently, smaller specific surface areas are preferred.

(i) Raman R Value (a) Definition of Raman R Value

A Raman spectrum is obtained by conducting the Raman spectroscopic examination which will be described later, and the ratio between the intensity $I_A$ of a maximum peak around 1,580 cm$^{-1}$ and the intensity $I_B$ of a maximum peak around 1,360 cm$^{-1}$ in the Raman spectrum, i.e., intensity ratio $I_B/I_A$, is defined as the Raman R value.

The Raman spectroscopic examination is made with Raman spectrometer "Raman Spectrometer manufactured by JASCO Corp." Particles to be examined are charged into a measuring cell by causing the particles to fall naturally into the cell, and the contents of the cell are irradiated with argon ion laser light to analyze the particles while rotating the measuring cell in a plane perpendicular to the laser light. Conditions for the examination are as follows.

Wavelength of argon ion laser light: 514.5 nm
Laser power on sample: 15-25 mW
Resolution: 4 cm$^{-1}$
Examination range: 1,100 cm$^{-1}$ to 1,730 cm$^{-1}$
Peak intensity determination, peak half-value width determination: background processing, smoothing
 (simple average; convolution, 5 points)

The maximum peak around 1,580 cm$^{-1}$ is a peak assigned to the crystalline structure of graphite, while the maximum peak around 1,360 cm$^{-1}$ is a peak assigned to carbon atoms reduced in symmetry due to a structural defect.

(b) Range

In requirement (d) in the invention, it is essential that the Raman R value should be 0.30 or smaller. The Raman R value is preferably 0.29 or smaller, especially preferably 0.28 or smaller. When the Raman R value exceeds the upper limit, there are cases where the charge/discharge irreversible capacity in initial cycling is too high. Furthermore, in requirement (d), it is essential that the Raman R value should be 0.10 or larger. Smaller Raman R values are preferred from the standpoint of performance. However, when composite graphite particles having a Raman R value smaller than 0.10 are to be obtained, there are cases where the production thereof results in an impaired yield and considerably impaired productivity.

The Raman half-value width of the maximum peak around 1,580 cm$^{-1}$ in the composite graphite particles of the invention is not particularly limited. However, the Raman half-value width thereof is in the range of generally from 18 cm$^{-1}$, preferably 19 cm$^{-1}$, to generally 23 cm$^{-1}$, preferably 21 cm$^{-1}$. When the Raman half-value width thereof is smaller than the lower limit of that range, the surface of such particles has too high crystallinity and there are cases where the crystals are apt to orient in directions parallel to the plane of the current collector upon densification, leading to a decrease in load characteristics. On the other hand, when the Raman half-value width thereof is larger than the upper limit of that range, there are cases where the surface of such particles is constituted of disordered crystals and has enhanced reactivity with an electrolytic solution, leading to a decrease in efficiency and enhanced gas evolution.

(ii) Average Degree of Circularity (a) Definition of Average Degree of Circularity The average degree of circularity is determined in the following manner. A 0.2 g portion of a sample to be examined (composite graphite particles) is mixed with a 50 mL of a 0.2% by volume aqueous solution of polyoxyethylene(20) sorbitan monolaurate as a surfactant. Flow type particle image analyzer "FPIA-2000, manufactured by Sysmex Industrial Corp." is used to propagate an ultrasonic wave of 28 kHz to the resultant dispersion for 1 minute at an output of 60 W. Thereafter, particles having a particle diameter in the range of from 10 µm to 40 µm are examined with the analyzer having a detection range set at 0.6 µm to 400 µm. The average degree of circularity is defined as the average of values of the degree of circularity given by the following expression.

Degree of circularity=(length of periphery of circle having the same area as projected particle area)/ (length of periphery of projected particle image)

(b) Range

In requirement (d) in the invention, the average degree of circularity is 0.85 or higher, more preferably 0.90 or higher. The upper limit thereof is preferably 0.98 or lower, especially preferably 0.95 or lower. When the average degree of circularity is lower than the lower limit of that range, there are cases where the amount of interparticle interstices is reduced, resulting in reduced load characteristics. On the other hand, for obtaining an average degree of circularity exceeding the upper limit of that range, it is necessary that a rounding treatment in which mechanical forces such as compressive, frictional, and shear forces, which are caused mainly by impact forces and also by interaction among the particles, etc., are repeatedly applied to particles should be conducted intensely or for a prolonged time period. In addition, it is necessary to remove fine particles which generate as a by-product of the rounding. There are hence cases where an increased production cost results.

(iii) Tap Density (a) Definition of Tap Density

In the invention, tap density is determined using powder densimeter "Tap Denser KYT-4000", manufactured by Seishin Enterprise Co., Ltd., in the following manner. Composite graphite particles are dropped through a sieve having an opening size of 300 µm into a cylindrical tapping cell having a diameter of 1.6 cm and a capacity of 20 cm$^3$ to fill up the cell with the particles. Thereafter, a tapping operation over a stroke of 10 mm is conducted 1,000 times, and the density of the sample is determined from the resultant volume of the sample and the weight thereof. This value of density is defined as the tap density.

(b) Range

The tap density of the composite graphite particles of the invention is not particularly limited. However, the tap density thereof is preferably 0.87 g/cm$^3$ or higher, more preferably 0.90 g/cm$^3$ or higher, especially preferably 0.95 g/cm$^3$ or higher, and is preferably 1.25 g/cm$^3$ or lower, more preferably 1.20 g/cm$^3$ or lower. In case where the tap density thereof is too low, it is necessary that the slurry of the negative-electrode material to be applied to a current collector in producing a negative electrode should have a reduced concentration and this slurry gives a coating film having a reduced density. There are hence cases where the composite graphite particles are apt to be broken by pressing, resulting in reduced battery performance. Conversely, when the tap density thereof is too high, there are cases where the slurry has impaired applicability and this additionally necessitates a step for regulating the shape and particle diameter distribution of the composite graphite particles, resulting in a reduced yield and an increased cost.

(iv) BET Specific Surface Area

The BET specific surface area of the composite graphite particles of the invention, which is the specific surface area determined by the BET method, is not particularly limited. However, the BET specific surface area thereof is generally 2.5 m$^2$/g or larger, preferably 3.0 m$^2$/g or larger, and is generally 8.0 m$^2$/g or smaller, preferably 6.0 m$^2$/g or smaller, more preferably 5.5 m$^2$/g or smaller, especially preferably 5 m$^2$/g or smaller. When the specific surface area thereof is smaller than the lower limit of that range, there are cases where output characteristics decrease. On the other hand, when the specific surface area thereof exceeds the upper limit of that range, there are cases where the battery obtained has an increased initial irreversible capacity and impaired cycle characteristics.

In the invention, specific surface area is determined and defined in the following manner. Specific surface area measuring apparatus "AMS8000", manufactured by Ohukura Riken Co., Ltd., is used to determine the surface area by the BET one-point method conducted by the nitrogen gas adsorption/flow method. Specifically, 0.4 g of a sample (composite graphite particles) is packed in a cell and heated to 350° C. to conduct a pretreatment. Subsequently, the sample is cooled to a liquid-nitrogen temperature and caused to adsorb a gas composed of 30% nitrogen and 70% helium to saturation. Thereafter, this sample is heated to room temperature, and the amount of the gas which has been desorbed is measured. From the results obtained, the specific surface area is calculated by the ordinary BET method.

(5) Requirement (e)

The composite graphite particles have a volume of pores ranging from 0.01 µm to 2 µm, as measured with a mercury porosimeter, of from 0.05 mL/g to 1 mL/g.

(a) Method of Determining Pore Volume of Composite Graphite Particles with Mercury Porosimeter and Definition of the Pore Volume In the invention, the pore volume of composite graphite particles is determined with a mercury porosimeter, i.e., pore volume measuring apparatus "Autopore IV9520, manufactured by Micromeritics Corp." in the following manner. A sample is placed in an accessory cell and this cell is closed. The sample in the cell is pretreated by holding it under reduced pressure (50 µmHg) at room temperature for 10 minutes. Subsequently, mercury is pressurized stepwise from 4.0 psia (pounds per square inch, absolute) to 40,000 psia and the pressure is then lowered stepwise to 3.0 psia. The pore volume is determined from the measured amounts of the mercury penetrated. More specifically, a pore diameter D is calculated from the pressure P applied to the mercury in each step, using the Washburn equation ($D=-(1/P)4\gamma \cos \psi$). A mercury penetration/recession curve is thus obtained, and the pore volume is defined as a value obtained from this curve. In the equation, $\gamma$ represents the surface tension of mercury and $\psi$ represents contact angle.

(b) Range

The volume of pores ranging from 0.01 µm to 2 µm of the composite graphite particles in the invention, which is determined by the method described above, is preferably 0.05 mL/g or larger, more preferably 0.1 mL/g or larger, especially preferably 0.2 mL/g or larger, and is preferably 1 mL/g or smaller, more preferably 0.5 mL/g or smaller, especially preferably 0.4 mL/g or smaller. The composite graphite particles tend to have an increased volume of pores ranging from 0.01 μm to 2 μm due to the pulverization/grinding conducted during the production of the particles. The increased volume of pores in that range is expected to improve electrolytic-solution infiltration into the particles. The movement of lithium ions in inner parts of the electrode hence becomes smooth, and this in turn contributes to an improvement in battery cycle characteristics and an improvement in charge/discharge load characteristics.

(6) Requirement (f)

The amount of CO groups present on the surface normalized with the BET specific surface area is from 1.15 μmol/m$^2$ to 5 μmol/m$^2$.

(a) Method of Determining Amount of CO Groups on Surface of the Composite Graphite Particles In the invention, the amount of CO groups present on the surface of the composite graphite particles was determined by TPD-MS (temperature programmed desorption & decomposition mass-spectroscopy). The temperature programmed desorption is a technique in which trace gaseous ingredients generated or desorbed by heating a sample are identified and the amounts thereof and the temperatures at which the ingredients are generated are measured to thereby analyze the chemical properties of the sample. As a mass spectrometer (MS), it is necessary to use one for inorganic-gas analysis which has sufficient detection sensitivity in a low-mass region where m/z is from 2 to 200. Furthermore, for avoiding the influence of oxidation by the heat emitted from the heated sample and thereby lowering the blank level in the analysis, it is necessary to use, as a carrier gas, helium gas from which $O_2$, $H_2O$, $N_2$, and $CO_2$ have been sufficiently removed and to employ an analyzer capable of minimizing leakage into the analysis system. A measure of the exclusion of such an undesirable gas is that in blank analysis, the intensity of the peak assigned to $O_2$ (m/z=32) should be not higher than that of the slight peak at m/z=8 assigned to the helium as the carrier gas.

The amount of CO groups present on the surface of the composite graphite particles in the invention is obtained by heating a sample from room temperature to 1,000° C. with TPD-MS analyzer "AGS-7000, manufactured by Anelva Corp.", analyzing the CO (m/z=28), $CO_2$ (m/z=44), $H_2O$ (m/z=18), and other gaseous ingredients which have generated upon the heating with a mass spectrometer, and determining the amounts of those gases from the resultant values of area using standard gas calibration curves for the respective gases. The amount of CO groups present on the surface of the composite graphite particles is defined as the amount of the CO generated.

(b) Range

The "amount of CO groups present on the surface normalized with the BET specific surface area" of the composite graphite particles in the invention is preferably 1.15 μmol/m$^2$ or larger, more preferably 1.20 μmol/m$^2$ or larger, especially preferably 1.35 μmol/m$^2$ or larger, and is preferably 5 μmol/m$^2$ or smaller, more preferably 4 μmol/m$^2$ or smaller, especially preferably 3 μmol/m$^2$ or smaller. When the amount of CO groups present on the surface of the composite graphite particles is large, these composite graphite particles have an improved affinity for CMC and the SBR to be attached thereto has improved dispersibility. As a result, satisfactory electrode properties are maintained and the battery has improved cycle characteristics.

(7) Requirement (g)

When an electrode is produced by preparing a slurry using the composite graphite particles under the following conditions (i), subsequently applying the slurry to a rolled copper foil by the doctor blade method, drying the coating, and then pressing the dried coating so as to result in an active-material layer density of 1.70 g/cm$^3$ and 5-μL drops of an electrolytic solution having the following composition (ii) are put from a height of 5 cm onto a longitudinal central part of the electrode, then the average time period required for the electrolytic solution to disappear completely from the electrode surface is 180 seconds or shorter.

(i) Slurry Preparation Conditions

A 20.00±0.02 g portion of the composite graphite particles, 20.00±0.02 g of 1% by mass aqueous carboxymethyl cellulose (CMC) solution, and 0.25±0.02 g of an aqueous styrene/butadiene rubber (SBR) dispersion are weighed out and manually stirred, and the resultant mixture is stirred with a planetary rotary mixer (hybrid mixer) for 5 minutes and defoamed for 30 seconds to prepare the slurry.

The carboxymethyl cellulose (CMC) to be used here has a weight-average molecular weight of 250,000-300,000 and a degree of etherification of 0.55-0.65. The styrene/butadiene rubber (SBR) has a weight-average molecular weight of 270,000. The slurry obtained in (i) is applied by the doctor blade method in such an amount as to result in a film thickness of 11.0±0.1 mg/cm$^2$ on a dry basis, and the coating solvent is sufficiently removed.

(ii) Composition of Electrolytic Solution $LiPF_6$ is incorporated in a concentration of 1.0 M into a mixed solvent composed of ethylene carbonate (EC), ethyl methyl carbonate (EMC), and dimethyl carbonate (DMC) (volume ratio=2:2:3), and 2% by volume vinylene carbonate is further added thereto.

The electrolytic solution having the composition described in (ii) above is dropped from a height of 5 cm onto five areas in a longitudinal central part of the electrode with a microsyringe so that one drop is 5 μL. The average time period required for the electrolytic solution to disappear completely from the electrode surface is determined.

(iii) Range

In the invention, the time period required for the electrolytic solution to disappear from the electrode surface is not particularly limited. However, the time period is preferably 180 seconds or shorter, more preferably 140 seconds or shorter, especially preferably 120 seconds or shorter, even more preferably 110 seconds or shorter. When the electrolytic-solution disappearance time is long, there are cases where impregnation with an electrolytic solution in battery fabrication requires much time, leading to a decrease in productivity. Furthermore, that the time period required for an electrolytic solution to disappear is long means that the infiltration of the electrolytic solution in inner parts of the electrode plate is poor. There are hence cases where the poor infiltration leads to a decrease in battery characteristics, in particular, charge/discharge load characteristics and cycle characteristics. It is therefore necessary to employ an electrode plate which is satisfactory in electrolytic-solution infiltration thereinto and to use a material for constituting such electrode. The composite graphite particles for nonaqueous secondary batteries in the invention are particles capable of imparting satisfactory electrolytic-solution infiltration because of the characteristic particle structure thereof.

(8) Other Requirements (i) On-Electrode Graphite Crystal Orientation Ratio

The on-electrode graphite crystal orientation ratio $I_{110}/I_{004}$, which is determined by examining in the following manner a given electrode plate produced by the following Electrode Plate Production Method A using the composite graphite particles for nonaqueous secondary batteries according to the invention, is not particularly limited. However, the orientation ratio $I_{110}/I_{004}$ is generally 0.08 or higher, preferably 0.09 or higher, especially preferably 0.10 or higher, and is generally 0.20 or lower, preferably 0.18 or lower, especially preferably 0.16 or lower. In case where the orientation ratio $I_{110}/I_{004}$ is lower than the lower limit of that range, the battery fabricated shows enhanced expansion when charged, making it difficult to increase battery capacity per unit volume of the electrode. In addition, this battery, in a cycle test, is apt to suffer active-material shedding or the like due to expansion/contraction, resulting in a decrease in cycle characteristics. On the other hand, when the orientation ratio $I_{110}/I_{004}$ exceeds the upper limit of that range, there are cases where the loading density of the electrode is difficult to increase through pressing.

The on-electrode graphite crystal orientation ratio $I_{110}/I_{004}$ is an index to the degree of orientation of graphite-crystal hexagonal network planes relative to the thickness direction for the electrode. The higher the orientation ratio $I_{110}/I_{004}$, the more the direction of the graphite-crystal hexagonal network planes in the particles are uneven.

(a) Electrode Plate Production Method A

Two parts by weight, on a solid basis, of an aqueous styrene/butadiene rubber dispersion and 1 part by weight, on a solid basis, of an aqueous carboxymethyl cellulose (weight-average molecular weight, 250,000-300,000) solution are added to 100 parts by weight of the composite graphite particles to obtain a slurry. This slurry is applied to a current collector constituted of a copper foil having a thickness of 18 μm with a doctor blade so that the slurry adheres to the foil in an amount of 10±0.1 mg/cm² on a dry basis. The slurry applied is dried. Thereafter, the resultant coating is compacted by one pressing operation with a roller press (calendar) at a pressing load regulated so as to result in an active-material layer having a density of 1.73±0.03 g/cm³.

(b) Method of Determining On-Electrode Graphite Crystal Orientation Ratio

The electrode plate produced by Electrode Plate Production Method A is analyzed by X-ray diffractometry to obtain charts for the (110) plane and (004) plane of the graphite on the electrode plate. The charts obtained are subjected to fitting with asymmetric Pearson VII as a profile function to conduct peak separation. Thus, the integrated intensities of the peaks assigned respectively to the (110) plane and (004) plane are calculated. From the integrated intensities obtained, the proportion represented by (integrated intensity for (110) plane)/(integrated intensity for (004) plane) is calculated. This proportion is defined as the on-electrode graphite crystal orientation ratio.

Conditions for this X-ray diffractometry are as follows. Incidentally, "2θ" represents diffraction angle.
Target: Cu ($K_\alpha$ line) graphite monochromator
Slit:
   Divergence slit=1 degree
   Receiving slit=0.1 mm
   Scattering slit=1 degree
Examination range and step angle/measuring time:
   (110) plane: $76.5° \leqq 2\theta \leqq 78.5°$ 0.01°/3 sec
   (104) plane: $53.5° \leqq 2\theta \leqq 56.0°$ 0.01°/3 sec
Sample preparation:

The given electrode is fixed to a glass plate with a double-faced pressure-sensitive adhesive tape having a thickness of 0.1 mm.

(ii) Pressing Load

The range of the pressing load necessary for producing the electrode plate including an active-material layer having a density of 1.73±0.03 g/cm³ by Electrode Production Method A is not particularly limited. However, the composite graphite particles desirably are ones for which the pressing load per 5-cm length is preferably 200 kgf/5 cm or higher, especially preferably 250 kgf/5 cm or higher, more preferably 300 kgf/5 cm or higher, and is generally 1,200 kgf/5 cm or lower, preferably 1,000 kgf/5 cm or lower, especially preferably 850 kgf/5 cm or lower. Namely, composite graphite particles from which an electrode including an active-material layer having a density of 1.73±0.03 g/cm³ can be produced using a pressing load regulated so as to be within that range are preferred as the composite graphite particles of the invention.

Composite graphite particles for which the pressing load is lower than the lower limit are apt to be crushed, making it difficult to regulate the density of the active-material layer of the electrode. There are hence cases where the electrode obtained using such particles is poor in electrolytic-solution infiltration thereinto and has a reduced infiltration rate. Furthermore, there are cases where crushed particles of the negative-electrode material clog the paths for lithium ions, and this may result in a decrease in rate characteristics. On the other hand, composite graphite particles for which the pressing load exceeds the upper limit tend to give an active-material layer which is apt to peel off the electrode.

Processes for producing the composite graphite particles having the pressing load within that range are not particularly limited. However, the composite graphite particles can be obtained by contriving a spherical graphitic substance, binder amount, degree of graphitization, etc.

[2] Negative-Electrode Material for Nonaqueous Secondary Battery

The composite graphite particles of the invention for nonaqueous secondary batteries (hereinafter often abbreviated to "composite graphite particles (A)") may be used by themselves as a negative-electrode material for nonaqueous secondary batteries. However, it is also preferred that carbonaceous particles of one or more kinds differing in shape or property from the composite graphite particles and selected from the group consisting of a natural graphite, artificial graphite, carbon fibers obtained by vapor phase growth, conductive carbon black, amorphous-substance-coated graphite, resin-coated graphite, and amorphous carbon (hereinafter, the carbonaceous particles are abbreviated to "carbonaceous particles (B)") should be further incorporated to constitute a negative-electrode material for nonaqueous secondary batteries.

By suitably selecting carbonaceous particles (B) and mixing the particles, conductivity can be improved to thereby attain an improvement in cycle characteristics, improvement in suitability for charge, and reduction in irreversible capacity. In addition, suitability for pressing can also be improved.

In the case where carbonaceous particles (B) are to be mixed, the lower limit of the amount thereof based on the whole negative-electrode material is generally 0.1% by mass or larger, preferably 0.5% by mass or larger, more preferably 0.6% by mass or larger. The upper limit thereof is generally 80% by mass or smaller, preferably 50% by mass or smaller, more preferably 40% by mass or smaller. When the amount thereof is smaller than the lower limit of that range, there are cases where the effect of improving conductivity is less apt to be obtained. When the amount thereof exceeds the upper limit of that range, there are cases where the incorporation thereof caused an increase in initial irreversible capacity.

As the natural graphite among the carbonaceous particles (B), use can be made, for example, of a highly purified flake graphite or a rounded graphite. The volume-average particle diameter of the natural graphite is generally 8 μm or larger, preferably 10 μm or larger, and is generally 60 μm or smaller, preferably 40 μm or smaller. The BET specific surface area of the natural graphite is generally 4 m$^2$/g or larger, preferably 4.5 m$^2$/g or larger, and is generally 9 m$^2$/g or smaller, preferably 5.5 m$^2$/g or smaller.

As the artificial graphite, use can be made, for example, of particles obtained from particles constituted of a coke powder or natural graphite combined with a binder or from particles constituted of a single graphite precursor, by burning the particles in a powder form to graphitize the same.

As the amorphous-substance-coated graphite, use can be made, for example, of either particles obtained by coating a natural graphite or artificial graphite with a precursor for an amorphous substance and burning the coated graphite or particles obtained by coating the surface of a natural graphite or artificial graphite with an amorphous substance.

As the resin-coated graphite, use can be made, for example, of particles obtained by coating a natural graphite or artificial graphite with a polymeric material and drying the coating. As the amorphous carbon, use can be made, for example, of particles obtained by burning a bulk mesophase or particles obtained by subjecting a carbon precursor to an infusibility-imparting treatment and then burning the same.

Of those carbonaceous materials for use as the carbonaceous particles (B) to be added to the composite graphite particles of the invention, the natural graphite is especially preferred because the use thereof is effective in maintaining a high capacity.

In the case where the carbonaceous particles (B) are mixed with the composite graphite particles (A) and this mixture is used as a negative-electrode material, the proportion of the carbonaceous particles (B) may be in the following range. When the carbonaceous particles to be mixed are smaller than 5 μm, the proportion thereof based on the whole negative-electrode material is generally 0.1% by mass or larger, preferably 0.5% by mass or larger, more preferably 0.6% by mass or larger. When the carbonaceous particles to be mixed have a size of 5 μm or larger, the proportion thereof based on the whole negative-electrode material is preferably 5% by mass or larger, especially preferably 15% by mass or larger. The proportion of the carbonaceous particles (B) is generally 95% by mass or smaller, preferably 80% by mass or smaller. When the proportion of the carbonaceous particles (B) is smaller than the lower limit of that range, there are cases where the effects of the addition of the carbonaceous particles (B) are difficult to produce. On the other hand, when the proportion thereof exceeds the upper limit of that range, there are cases where the properties of the composite graphite particles (A) are difficult to obtain.

The negative-electrode material of the invention has a pressing load per 5 cm, as determined in the same manner as described above under Properties of Carbonaceous Particles, of preferably 200 kgf/5 cm or higher, especially preferably 250 kgf/5 cm or higher, even more preferably 300 kgf/5 cm or higher. The pressing load thereof is generally 1,200 kgf/5 cm or lower, preferably 1,000 kgf/5 cm or lower, especially preferably 850 kgf/5 cm or lower.

That is, the pressing load to be imposed in the following operation is preferably within that range. A hundred parts by weight of the negative-electrode material is mixed with 2 parts by weight, on a solid basis, of an aqueous styrene/butadiene rubber dispersion and 1 part by weight, on a solid basis, of an aqueous solution of carboxymethyl cellulose having a weight-average molecular weight of 250,000-300,000 to obtain an aqueous slurry. This aqueous slurry is applied with a doctor blade to a copper foil having a thickness of 18 μmin such an amount as to result in a dry-film thickness of 10±0.1 mg/cm$^2$ and dried. Thereafter, using a roller press having metallic rollers with a diameter of 20 cm, the coated foil is pressed once by passing through the nip between the two rollers to form an active-material layer having a width of 5 cm. In this pressing, the pressing load is regulated so as to result in a density of 1.73±0.03 g/cm$^3$.

Negative-electrode materials for which the pressing load is lower than the lower limit are apt to suffer particle crushing, making it difficult to regulate the density of the active-material layer of the electrode. There are hence cases where the electrode obtained using such a negative-electrode material is poor in electrolytic-solution infiltration thereinto and has a reduced infiltration rate. Furthermore, there are cases where crushed particles of the negative-electrode material clog the paths for lithium ions, and this may result in a decrease in rate characteristics. On the other hand, negative-electrode materials for which the pressing load exceeds the upper limit tend to give an active-material layer which is apt to peel off the electrode. There are cases where such negative-electrode materials necessitate a press having higher ability.

Methods for preparing the negative-electrode material having a pressing load within that range are not particularly limited. However, the composite graphite particles (A) can be obtained by contriving the kind of carbonaceous particles, binder amount, degree of graphitization, etc., while the negative-electrode material can be obtained by optimizing the proportion of the composite graphite particles (A) to the carbonaceous particles (B) according to a difference in softness between the two particulate materials (A) and (B).

A production process is explained below. The composite graphite particles of the invention may be produced by mixing raw materials including spherical graphite particles and a binder and subjecting the mixture to molding, burning with elimination of volatile ingredients, graphitization, pulverization, and classification according to need. For producing composite graphite particles of the invention which satisfy one or more of the properties described above, it is important to employ two or more of the following contrivances in combination.

Examples of contrivances concerning raw materials include to select a rounded graphite having a high average degree of circularity as a major component of the spherical graphite particles.

Other contrivances include one in which when spherical graphite particles are kneaded together with a binder, the kind and amount of a pitch or the like to be used as the binder are optimized. In still another contrivance, the intensity of pulverization is optimized.

A preferred process for producing the composite graphite particles of the invention, etc. is explained below in detail.

First, spherical graphite particles are kneaded together with a binder with heating. In this operation, a graphitization catalyst may be added according to need. Preferred carbonaceous particles, binders, and graphitization catalysts are as follows.

(i) Spherical Graphite Particles

The main component of the spherical graphite particles preferably is one having a high sphericity from the standpoint of obtaining particles having a high tap density in order to enhance applicability. Especially preferred is a rounded natural graphite. Examples thereof generally include one obtained from a natural graphite having such high crystallinity that the interplanar spacing for the (002) planes ($d_{002}$) thereof as determined by wide-angle X-ray diffractometry is 0.340 nm or smaller. Specifically, graphite particles obtained by improving the degree of circularity of a natural graphite or of a mixture of a natural graphite and a mechanically pulverized product are preferred.

The spherical graphite particles are not particularly limited in the median diameter of a volume-based particle diameter distribution determined by laser diffraction/scattering type particle diameter analysis. However, the median diameter thereof is generally 5 μm or larger, preferably 6 μm or larger, especially preferably 8 μm or larger, and is generally 40 μm or smaller, preferably 35 μm or smaller, especially preferably 30 μm or smaller. In case where the median diameter of the carbonaceous particles is smaller than the lower limit, an increased cost is apt to result. In case where the median diameter thereof exceeds the upper limit, such particles are apt to be causative of a failure during application. The median diameter of the carbonaceous particles can be determined in the same manner as the median diameter of the negative-electrode material described above.

The average particle diameter of the spherical graphite particles preferably is at least 0.93 times the average particle diameter of the target composite graphite particles. It is especially preferred to use spherical graphite particles having an average particle diameter equal to or larger than that of the target composite graphite particles.

The spherical graphite particles to be used as a raw material for the composite graphite particles of the invention especially preferably are ones which have undergone a rounding treatment. As an apparatus for the rounding treatment, use can be made, for example, of an apparatus which repeatedly applies impact force as a main force and other mechanical actions such as compressive, frictional, and shear forces, including those caused by particle interaction, to the particles. Specifically, a preferred apparatus is one which comprises a casing and, disposed therein, a rotor having many blades and in which the rotor is rotated at a high speed to thereby apply mechanical actions such as impact, compressive, frictional, and shear forces to a carbon material introduced therein and conduct a surface treatment. Also preferred is one which has a mechanism in which a carbon material is circulated to thereby repeatedly apply mechanical actions thereto. Examples of such preferred apparatus include Hybridization System (manufactured by Nara Machinery Co., Ltd.), Kryptron (manufactured by Earth Technica Co., Ltd.), CF Mill (manufactured by Ube Industries, Ltd.), Mechanofusion System (manufactured by Hosokawa Micron Corp.), and θ-Composer (manufactured by Tokuju Kosakusho Co., Ltd.).

Preferred of these are Hybridization System, manufactured by Nara Machinery Co., Ltd. In the case where the treatment is conducted with this apparatus, the rotor is rotated at a peripheral speed of preferably 30-100 m/sec, more preferably 40-100 m/sec, even more preferably 50-100 m/sec. Although a carbonaceous substance can be treated by merely passing the substance through the apparatus, it is preferred to treat the carbonaceous substance while causing the substance to circulate or reside in the apparatus for 30 seconds or longer. More preferably, the carbonaceous substance is treated while circulating or residing in the apparatus for 1 minute or longer.

The average degree of circularity of the spherical graphite particles is generally 0.85 or higher, preferably 0.9 or higher, and is generally 1.0 or lower, preferably 0.96 or lower. In case where the average degree of circularity of the carbonaceous particles is lower than the lower limit, a reduced degree of orientation is apt to result. Average degrees of circularity thereof exceeding the upper limit are apt to result in an increase in cost. The average degree of circularity of the spherical graphite particles is determined in the same manner as the average degree of circularity of the negative-electrode material described above.

The tap density of the spherical graphite particles is generally 0.8 g/cm$^3$ or higher, preferably 0.9 g/cm$^3$ or higher, more preferably 0.95 g/cm$^3$ or higher, and is generally 1.35 g/cm$^3$ or lower, preferably 1.2 g/cm$^3$ or lower. When the tap density of the spherical graphite particles is lower than the lower limit of that range, these spherical graphite particles give an active material which is less apt to attain a high loading density. There are hence cases where a high-capacity battery is not obtained. On the other hand, in case where the tap density thereof exceeds the upper limit of that range, it is difficult to obtain such spherical graphite particles with satisfactory yield and this may lead to an increase in cost. For determining the top density, use is made of the same method as that described above with regard to the composite graphite particles for secondary batteries. In this description, the term "spherical" in "spherical graphite particles" means any of shapes including shapes near to the so-called sphere, such as, e.g., ellipsoids.

(ii) Graphitizable Binder

Examples of the "graphitizable binder" (hereinafter often referred to simply as "binder") include impregnation pitch, binder pitch, coal tar pitch, coal-derived heavy oils such as coal liquefaction oil, and petroleum-derived heavy oils such as straight-run heavy oils, e.g., asphaltene, and cracking heavy oils, e.g., ethylene-heavy end tar.

The amount of quinoline-insoluble ingredients contained in the binder is generally 0-10% by mass. However, the smaller the amount thereof, the more the binder is preferred from the standpoints of hardness and battery capacity. In case where the content of quinoline-insoluble ingredients in the binder is too high, the composite graphite particles obtained with this binder have too high a strength, resulting in a tendency that even when an active-material layer applied to a current collector is pressed, the particles do not deform and the layer is difficult to densify. In addition, there are cases where a reduced capacity also results.

The binder is used in such an amount that in the composite graphite particles produced through a graphitization treatment, i.e., obtained by carbonization/graphitization, the proportion of the component derived from the binder in the composite graphite particles is generally 1% by mass or higher, preferably 5% by mass or higher, more preferably 10% by mass or higher. With respect to the upper limit of that amount, the proportion of that component is generally 60% by mass or lower, preferably 40% by mass or lower, even more preferably 30% by mass or lower. In case where the binder amount is too large, the final product contains a large amount of the amorphous part derived from the binder. There are hence cases where this final product gives a battery having a reduced capacity. In addition, the composite graphite particles obtained are hard and, hence, not the part derived from the binder but the graphitic particles themselves derived from the carbonaceous particles are apt to break when the active-material layer applied to a current collector is pressed. On the other hand, when the binder amount is too small, the composite graphite particles obtained are too soft, resulting in cases where satisfactory charge/discharge characteristics are not obtained.

The binder amount in the composite graphite particles is controlled by regulating the amount of the binder to be added prior to kneading. For example, when the binder has a residual carbon content, as determined by the method provided for in JIS K2270, of p %, then it is necessary to add the binder in an amount 100/p times the target amount.

A contrivance concerning the addition of a binder, e.g., a pitch or tar, is to evenly disperse the binder at the lowest possible temperature in the shortened possible time period. This is preferred for reducing initial irreversible capacity and reducing pressing load. The dispersing operation at a low temperature in a short time may be accomplished by intensifying the stirring to such a degree that the carbonaceous particles do not break.

(iii) Graphitization Catalyst

A graphitization catalyst may be added in the mixing of the carbonaceous particles with the binder in order to increase charge/discharge capacity and improve suitability for pressing. Examples of the graphitization catalyst include metals such as iron, nickel, titanium, silicon, and boron and compounds of these metals, such as carbides, oxides, and nitrides. Preferred of these are silicon, silicon compounds, iron, and iron compounds. Especially preferred of the silicon compounds is silicon carbide. Especially preferred of the iron compounds is an iron oxide.

In the case where silicon or a silicon compound is used as the graphitization catalyst, this catalyst upon heating yields silicon carbide and this silicon carbide is wholly pyrolyzed at temperatures not lower than 2,800° C. and grows graphite having exceeding satisfactory crystallinity. In addition, the silicon, when volatilizing, forms pores between graphite crystals. Consequently, the charge-transfer reaction and diffusion of lithium ions within each particle are promoted, whereby battery performance can be improved. In the case where iron or a compound thereof is used as the graphitization catalyst, this catalyst grows graphite having satisfactory crystallinity due to the mechanism of carbon dissolution in the catalyst and precipitation thereof, whereby this catalyst can produce the same effect as silicon.

The amount of these graphitization catalysts to be added is generally 30% by mass or smaller, preferably 20% by mass or smaller, more preferably 10% by mass or smaller, especially preferably 5% by mass or smaller, based on the carbonaceous primary particles as a raw material. In case where a graphitization catalyst is added in too large an amount, graphitization proceeds excessively and this may pose a problem that properties necessary for producing lithium ion secondary batteries, in particular, electrolytic-solution infiltration, are insufficient. Simultaneously therewith, the composite graphite particles come to have a reduced strength probably because of the pores formed in the particles. As a result, there also are cases where surface smoothing occurs in a pressing step during electrode production to inhibit ion movement.

On the other hand, in case where a graphitization catalyst is added in too small an amount, graphitization is insufficient and the resultant composite graphite particles give a nonaqueous secondary battery having a problem concerning a reduced charge/discharge capacity. In addition, use of the resultant composite graphite particles necessitates a high pressure in a pressing step during electrode production, and there are even cases where densification is difficult. Moreover, the composite graphite particles thus obtained have too high a strength probably because an appropriate amount of pores are not present in the particles. Because of this, when the active-material layer applied to a current collector is pressed to a given bulk density, a high pressure is necessary and there are cases where it is difficult to densify the negative-electrode active-material layer.

(iv) Kneading (Mixing)

The raw materials including the carbonaceous particles, binder, and other ingredients optionally added, such as a graphitization catalyst, are first kneaded with heating. As a result, the mixture comes into a state in which the liquid binder has been attached to the carbonaceous particles and other raw materials which do not melt at the kneading temperature. In this case, use may be made of a method in which all the raw materials are charged into a kneading machine and are kneaded and heated simultaneously. Alternatively, use may be made of a method in which the ingredients other than the binder are charged into a kneading machine and heated with stirring and, after the temperature of the mixture has risen to a kneading temperature, the binder having ordinary temperature or in a vulcanized molten state is charged.

The heating temperature is not lower than the softening point of the binder. In case where too low a heating temperature is used, the binder has high viscosity to make the mixing difficult. Consequently, the kneading is conducted generally at a temperature higher than the softening point by at least 10° C., preferably at a temperature higher than the softening point by at least 20° C. In case where too high a heating temperature is used, the mixture system has too high a viscosity due to the volatilization and polycondensation of the binder. Consequently, the heating temperature is generally 300° C. or lower, preferably 250° C. or lower.

The kneading machine preferably is of the kind having one or more stirring blades. As the stirring blades, use can be made of general-purpose ones such as the Z blade type and matiscator type. The amount of the raw materials to be charged into the kneading machine is generally at least 10% by volume, preferably at least 15% by volume of the capacity of the mixing machine, and is generally up to 50% by volume, preferably up to 30% by volume of the capacity. A kneading time of at least 5 minutes is necessary. The kneading may be conducted, at the most, until a large viscosity change is caused by the volatilization of a volatile matter. Usually, the kneading is conducted for 30-120 minutes. It is preferred that the kneading machine should be preheated to the kneading temperature before the kneading.

(v) Molding

The mixture obtained by the kneading may be subjected as it is to the step of volatile matter (hereinafter abbreviated to "VM") removal and burning, which is conducted for the purposes of removing VMs and carbonization. It is, however, preferred that before being subjected to the VM removal/burning step, the mixture should be molded in order to facilitate handling.

Methods of molding are not particularly limited so long as the resultant molded object can retain the shape. Extrusion molding, molding with a mold, isostatic molding, or the like can be employed. Of these techniques, molding with a mold is preferable to extrusion molding, in which particles in the molded object are apt to be oriented, and to isostatic molding, which has a problem concerning productivity although random particle orientation is maintained. The molding with a mold has an advantage that the operation is relatively easy and a molded object can be obtained without destroying the randomly oriented structure obtained by the kneading.

With respect to molding temperature, the molding may be conducted either at room temperature (cold molding) or with heating (hot molding; at a temperature not lower than the softening point of the binder). In the case of conducting cold molding, it is desirable for improving moldability and obtaining uniformity of molded objects that the mixture which has been cooled after the kneading should be crushed beforehand to a maximum size of 1 mm or smaller. The shape and size of the molded object are not particularly limited. In hot molding, however, formation of too large a molded object poses a problem that even preheating which is conducted prior to the molding requires much time. It is therefore preferred to regulate the size thereof to generally about 150 cm at the most.

With respect to molding pressure, there are cases where too high a molding pressure gives a molded object in which the removal of volatile matters (VM removal) through pores of the molded object is difficult and carbonaceous particles which are not truly circular have been oriented, making it difficult to conduct pulverization in a later step. Consequently, the upper limit of the molding pressure is generally 3 tf/cm² (294 MPa) or lower, preferably 500 kgf/cm² (49 MPa) or lower, more preferably 10 kgf/cm² (0.98 MPa) or lower. There is no particular lower limit on the pressure. However, it is preferred to set the pressure at such a degree that the shape of the molded object can be maintained in the VM removal step.

(vi) VM Removal/Burning

The molded object obtained is subjected to VM removal/burning in order to remove volatile matters (VMs) contained in the carbonaceous particles and binder and thereby prevent a packing from being fouled or adhering to the molded object during graphitization. The VM removal/burning is conducted at a temperature which is generally 600° C. or higher, preferably 650° C. or higher, and is generally 1,300° C. or lower, preferably 1,100° C. or lower, for generally from 0.1 hour to 10 hours. For the purpose of preventing oxidation, the heating is conducted in the stream of an inert gas, e.g., nitrogen or argon, or in a non-oxidizing atmosphere formed by filling spaces with a particulate carbon material such as, e.g., a breeze or packing coke.

Apparatus usable for the VM removal/burning are not particularly limited so long as the apparatus can be used for burning in a non-oxidizing atmosphere. Examples thereof include electric furnaces, gas furnaces, and Riedhammer furnaces for electrode materials. The heating rate in the heating desirably is low from the standpoint of removing volatile matters. In general, heating from about 200° C., at which low-boiling matters begin to volatilize, to about 700° C., at which hydrogen becomes the only substance which generates, is conducted at 3-100° C./hr.

(vii) Graphitization

The carbonized molding obtained by the VM removal/burning is subsequently graphitized by high-temperature heating. The heating for graphitization is conducted at a temperature of generally 2,600° C. or higher, preferably 2,800° C. or higher. On the other hand, too high heating temperatures result in considerable graphite sublimation. Consequently, temperatures not higher than 3,300° C. are preferred. Heating period is not particularly limited so long as the heating is conducted until the binder and the carbonaceous particles become graphite. Generally, the heating period is 1-24 hours.

With respect to atmospheres for the graphitization, the heating is conducted in the stream of an inert gas, e.g., nitrogen or argon, or in a non-oxidizing atmosphere formed by filling spaces with a particulate carbon material such as, e.g., a breeze or packing coke, in order to prevent oxidation. Apparatus usable for the graphitization are not particularly limited so long as the apparatus meet the purpose. Examples thereof include electric furnaces, gas furnaces, and Acheson furnaces for electrode materials. Heating rate, cooling rate, heat treatment period, etc. can be determined at will within the ranges allowable for the apparatus.

(viii) Pulverization

Usually, the graphitization product thus obtained, without any treatment, does not satisfy the requirements according to the invention. Consequently, pulverization or grinding is conducted. Steps therefor are roughly divided into the three steps of crushing, intermediate pulverization, and pulverization.

Methods for pulverizing/grinding the graphitization product are not particularly limited. Examples of pulverization/grinding devices include devices for mechanical grinding, such as, e.g., ball mills, hammer mills, CF mills, atomizer mills, and pulverizers, and pulverization devices utilizing wind force, such as, e.g., jet mills. For crushing and intermediate pulverization, use may be made of an impact type crushing device such as a jaw crusher, hammer mill, or roller mill. The timing of pulverization may be before the graphitization or after the graphitization. The latter timing is preferable because operations such as charging into crucibles are unnecessary, making the production less expensive.

(viii-1) Crushing, Intermediate Pulverization

In the case where "Pulverizer Type VM-32, manufactured by Orient Kogyo", for example, is used in the crushing/intermediate pulverization of the graphitization product, this treatment may be conducted in the following manner in order for the final product to satisfy the requirements described above according to the invention. The graphitization product is introduced into the pulverizer at a rate of 300 kg/min with a belt feeder and pulverized/ground at a pulverization blade rotation speed of 1,000 rpm or higher. In case where the graphitization product is excessively pulverized/ground in this pulverization step, a large amount of a fine powder generates on the surface of the particles of the graphitization product. There are cases where this fine powder increases the irreversible capacity in initial charge/discharge of a battery fabricated using an electrode obtained by applying the resultant pulverization product.

(viii-2) Pulverization

For pulverization, "Pulverizer Type TB-250, manufactured by Turbo Kogyo Co., Ltd." may, for example, be used. In this case, the graphitization product is introduced into the pulverizer at a rate of 50 kg/min, 55 kg/min, or 60 kg/min with a constant-delivery spiral feeder and pulverized. When the rate of introducing the pulverization product into the pulverizer is heightened and the pulverization blade rotation speed is kept constant, then there are cases where the pulverized particles of the graphitization product have a reduced specific surface area.

For satisfying the requirements according to the invention, the pulverization blade rotation speed in pulverization in the case of using, for example, "Pulverizer Type TB-250, manufactured by Turbo Kogyo Co., Ltd." is set at 6,450 rpm, 7,800 rpm, or 8,000 rpm. When the pulverization blade rotation speed of the pulverizer is heightened in the pulverization and the rate of introducing the graphitization product is kept constant, then the specific surface area of the pulverized particles of the graphitization product increases.

(ix) Classification

From the product of pulverization or grinding obtained, large-diameter particles/small-diameter particles (fine powder) may be removed according to need.

There are cases where the removal of large-diameter particles diminishes the occurrence of short-circuiting or coating unevenness. There also are cases where the removal of small-diameter particles (fine powder) reduces initial irreversible capacity. It is desirable that the particle size regulation by removing large-diameter particles and a fine powder should be conducted so that the resultant composite graphite particles, when examined by laser diffraction/scattering type particle diameter analysis, give a volume-based particle diameter distribution in which the proportion of particles having a particle diameter of 100 μm or larger is 3% by volume or lower based on the whole and that of particles having a particle diameter of 1 μm or smaller is 1% by volume or lower based on the whole.

For removing large-diameter particles/small-diameter particles, various techniques are usable. However, removal by sieving and classification is preferred from the standpoints of the simplicity and operability of apparatus and cost. Furthermore, sieving or classification has an advantage that the particle size distribution and average particle diameter of the composite graphite particles, which have been changed by the graphitization and the removal of large/small particles, can be regulated again according to need.

Examples of the sieving for removing large-diameter particles include sieve plane fixing sieving, in-plane movement sieving, and rotary sieving. However, from the standpoint of capacity, sieves of the blow-through type among sieves of the sieve plane fixing type are especially preferred. Sieves having an opening size not larger than 80 μm and not smaller than 30 μm are usable. The sieve to be used is suitably selected according to the state of particles which have generated and are to be removed (in particular, the amount and particle diameter thereof) and to the particle size distribution and average particle diameter which are desired to be imparted to the composite graphite particles. In case where the size thereof exceeds 80 μm, the removal of those particles is insufficient. Sizes thereof smaller than 30 μm lead to the excessive removal of composite graphite particles. There are hence cases where an increased product loss results and the regulation of particle size distribution is difficult. Incidentally, commercial sieves having an opening size of 45 μm or 38 μm, which are general-purpose sizes, can be advantageously used.

The classification can be conducted by air classification, wet classification, gravity classification, or the like. Methods for removing particles of 100 μm or larger are not particularly limited. However, when an influence on the properties of the composite graphite particles and the necessity of regulating the particle size distribution and average particle diameter of the composite graphite particles are taken into account, it is preferred to use an air classifier such as, e.g., a cyclone classifier. In this case, controlling the air amount and wind velocity can attain the removal of those particles and the regulation of the particle size distribution and average particle diameter of the composite graphite particles, like the sieve opening size regulation described above.

[3] Negative Electrode for Nonaqueous Secondary Battery

The composite graphite particles of the invention can be suitable for use as a negative-electrode material for nonaqueous secondary batteries, in particular, lithium ion secondary batteries. A mixture of the composite graphite particles (A) of the invention and carbonaceous particles (B) can also be suitable for use as a negative-electrode material as stated above.

Apparatus for mixing the composite graphite particles (A) with the carbonaceous particles (B) are not particularly limited. Examples of rotary mixers include cylindrical mixers, twin-cylinder mixers, double-cone mixers, regular-cube mixers, and hoe mixers. Examples of stationary mixers include spiral mixers, ribbon mixers, muller mixers, helical-flight mixers, pug mill type mixers, and fluidized-bed mixers.

The negative electrode as a component of a nonaqueous secondary battery may be constituted of a current collector and formed thereon an active-material layer including a negative-electrode material, a binder for electrode formation, a thickener, and a conductive material. The active-material layer is obtained generally by preparing a slurry including a negative-electrode material, binder for electrode formation, thickener, conductive material, and solvent, applying the slurry to a current collector, drying the coating, and pressing the coated current collector.

As the binder for electrode plate formation, any desired one can be used so long as the binder is stable to the solvent to be used for electrode production and to electrolytic solutions. Examples thereof include poly(vinylidene fluoride), polytetrafluoroethylene, polyethylene, polypropylene, styrene/butadiene rubbers, isoprene rubber, butadiene rubber, ethylene/acrylic acid copolymers, and ethylene/methacrylic acid copolymers. The binder for electrode plate formation may be used in an amount in the range of from generally 90/10 or higher, preferably 95/5 or higher, to generally 99.9/0.1 or lower, preferably 99.5/0.5 or lower, in terms of the weight ratio of negative-electrode material/binder for electrode plate formation.

Examples of the thickener include carboxymethyl cellulose, methyl cellulose, hydroxymethyl cellulose, ethyl cellulose, polyvinyl alcohol), oxidized starch, phosphorylated starch, and casein.

Examples of the conductive material include metallic materials such as copper and nickel and carbon materials such as graphite and carbon black.

Examples of the material of the current collector include copper, nickel, and stainless steel. Copper foils are preferred of these from the standpoint of ease of processing to thin film and from the standpoint of cost.

The density of the active-material layer varies depending on applications. For use in applications where capacity is important, the density thereof is generally 1.55 g/cm$^3$ or higher, preferably 1.60 g/cm$^3$ or higher, more preferably 1.65 g/cm$^3$ or higher, especially preferably 1.70 g/cm$^3$ or higher. When the density thereof is too low, there are cases where battery capacity per unit volume is not always sufficient. On the other hand, too high densities thereof may result in reduced charge/discharge high-load characteristics. Consequently, the density thereof is preferably 1.90 g/cm$^3$ or lower. The term "active-material layer" herein means a mix layer formed on a current collector and composed of an active material, binder for electrode plate formation, a thickener, a conductive material, etc. The term "density thereof" means the bulk density of the active-material layer as measured at the time when the electrode is used in battery fabrication.

[4] Nonaqueous Secondary Battery

The negative electrode for nonaqueous secondary batteries of the invention, which has been produced using the composite graphite particles of the invention and the negative-electrode material of the invention, is exceedingly useful as the negative electrode of a nonaqueous secondary battery, such as, in particular, a lithium ion secondary battery.

The selection of members necessary for battery constitution, such as the positive electrode and electrolytic solution as components of such a nonaqueous secondary battery, is not particularly limited. Examples of the materials, etc. of constituent members of the nonaqueous secondary battery are shown below. However, usable materials should not be construed as being limited to the following examples.

The nonaqueous secondary battery of the invention generally at least includes the negative electrode of the invention described above, a positive electrode, and an electrolyte.

The positive electrode is constituted of a positive-electrode current collector and formed thereon an active-material layer including a positive active material, a conductive material, and a binder for electrode plate formation. The active-material layer is obtained generally by preparing a slurry containing a positive active material, conductive material, and binder for electrode plate formation, applying the slurry to a current collector, and drying the coating.

As the positive active material can be used a material capable of occluding/releasing lithium. Examples thereof include lithium-transition metal composite oxide materials such as lithium-cobalt oxides, lithium-nickel oxides, and lithium-manganese oxides; transition metal oxide materials such as manganese dioxide; and carbonaceous materials such as fluorinated graphites. Specifically, use can be made of, for example, $LiFePO_4$, $LiFeO_2$, $LiCoO_2$, $LiNiO_2$, $LiMn_2O_4$, and compounds constituted of these elements in irregular proportions. Other usable examples include $MnO_2$, $TiS_2$, $FeS_2$, $Nb_3S_4$, $Mo_3S_4$, $CoS_2$, $V_2O_5$, $P_2O_5$, $CrO_3$, $V_3O_3$, $TeO_2$, and $GeO_2$.

As the positive-electrode current collector, it is preferred to use either a metal which is anodized in an electrolytic solution to form a passive-state coating film on the surface thereof or an alloy of the metal. Examples thereof include metals belonging to the Groups IIIa, IVa, and Va (Groups 3B, 4B, and 5B) and alloys thereof. Specific examples thereof include Al, Ti, Zr, Hf, Nb, Ta, and alloys containing these metals. Preferred are Al, Ti, Ta, and alloys containing these metals. In particular, aluminum and alloys thereof are desirable because these materials are lightweight and hence have a high energy density.

Examples of the electrolyte include electrolytic solutions, solid electrolytes, and gel-state electrolytes. Preferred of these are electrolytic solutions, in particular, nonaqueous electrolytic solutions. As the nonaqueous electrolytic solutions, use may be made of ones obtained by dissolving a solute in a nonaqueous solvent.

As the solute can be used an alkali metal salt, quaternary ammonium salt, or the like. Specifically, it is preferred to use one or more compounds selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$.

As the nonaqueous solvent, use can be made of, for example, cyclic ester compounds such as cyclic carbonates, e.g., ethylene carbonate and butylene carbonate, and γ-butyrolactone; chain ethers such as 1,2-dimethoxyethane; cyclic ethers such as crown ethers, 2-methyltetrahydrofuran, 1,2-dimethyltetrahydrofuran, 1,3-dioxolane, and tetrahydrofuran; chain carbonates such as diethyl carbonate, ethyl methyl carbonate, and dimethyl carbonate; and the like. One solute and one solvent may be selected and used. Alternatively, two or more solutes and two or more solvents may be mixed together and used. Preferred of such nonaqueous electrolytic solutions is one in which the nonaqueous solvent includes a cyclic carbonate and a chain carbonate. Compounds such as vinylene carbonate, vinylethylene carbonate, succinic anhydride, maleic anhydride, propanesulfone, and diethyl sulfone may have been added.

The content of those solutes in the electrolyte solution is preferably 0.2 mol/L or higher, especially preferably 0.5 mol/L or higher, and is preferably 2 mol/L or lower, especially preferably 1.5 mol/L or lower.

A nonaqueous secondary battery fabricated using the negative electrode of the invention in combination with a positive electrode of the metal chalcogenide type and an organic electrolytic solution including a carbonate type solvent as a main component, among the materials shown above, has a high capacity, a low irreversible capacity in initial cycling, a high capacity in rapid charge/discharge (satisfactory rate characteristics), and excellent cycle characteristics, has high storability and reliability in high-temperature standing, and is highly excellent in high-efficiency discharge characteristics and low-temperature discharge characteristics.

A separator is usually disposed between the positive electrode and negative electrode in order to prevent the positive electrode and negative electrode from coming into physical contact with each other. The separator preferably is one which has high ion permeability and low electrical resistance. The material and shape of the separator are not particularly limited. However, the separator preferably is one which is stable to the electrolytic solution and has excellent liquid retentivity. Examples of the separator include porous sheets or unwoven fabrics produced from polyolefins such as polyethylene and polypropylene.

The shape of the nonaqueous secondary battery of the invention is not particularly limited. Examples thereof include the cylinder type in which sheet electrodes and separators are spirally disposed, the cylinder type of an inside-out structure including a combination of pellet electrodes and a separator, and the coin type including a stack of pellet electrodes and a separator.

EXAMPLES

Embodiments of the invention are explained below in more detail by reference to Examples. However, the invention should not be construed as being limited by the following Examples.

Example 1

Graphite particles having an average particle diameter of 100 μm were subjected to a rounding treatment with Hybridization System Type NHS-3, manufactured by Nara Machinery Co., Ltd., at a rotor peripheral speed of 70 m/sec for 9 minutes to obtain spherical graphite particles having an average particle diameter of 21.7 μm.

These spherical graphite particles were mixed with a binder pitch having a softening point of 88° C. as a graphitizable binder, in a weight ratio of 100:30. This mixture was charged into a kneader which had a matiscator type stirring blade and had been preheated at 128° C. The mixture was kneaded for 20 minutes.

The mixture which had been sufficiently kneaded was packed into the mold of a mold press preheated at 108° C. The mixture in the mold was allowed to stand for 5 minutes to make the temperature of the mixture stable. Thereafter, the plunger was pushed to apply a pressure of 2 kgf/cm³ (0.20 MPa) to mold the mixture. This pressure was maintained for 1 minute and the operation was then stopped. After the pressure drop had ended, the molded object was taken out.

The molded object obtained was placed in a metallic sagger as a refractory vessel, and the spaces therein were filled with a graphitic breeze. In an electric furnace, this molded object was heated from room temperature to 1,000° C. over 48 hours and held at 1,000° C. for 3 hours to conduct VM removal/burning. Subsequently, the molded object was placed in a graphite crucible, and the spaces therein were filled with a graphitic breeze. This molded object was heated at 3,000° C. for 4 hours in an Acheson furnace to conduct graphitization.

The graphitic molded object obtained was crushed with a jaw crusher and then pulverized with a mill having a pulverization blade rotation speed set at 8,000 rpm. The resultant powder was screened with a 45-μm sieve to remove coarse particles. Thus, composite graphite particles were obtained. These composite graphite particles were examined for surface state, ratio of the median diameter of the raw-material spherical graphite particles (a) to the median diameter of the composite graphite particles (b) (c=a/b), Raman R value, median diameter, tap density, BET specific surface area, average degree of circularity, powder void amount, CO group amount normalized with BET specific surface area, and amount of laminate cell swelling in a high-temperature durability test conducted at 85° C. for 3 days (referred to as "cell swelling amount in high-temperature durability test") by the determination methods described above. The results obtained are shown in Table 1.

(i) Method of Producing Electrode (Negative-Electrode Sheet) and Measurement of Pressing Load The composite graphite particles were used as a negative-electrode material to produce an electrode having an active-material layer with a density of 1.70±0.03 g/cm$^3$ by the method described above. Specifically, 20.00±0.02 g of the negative-electrode material, 20.00±0.02 g (0.200 g in terms of solid amount) of 1% by mass aqueous solution of carboxymethyl cellulose, and 0.25±0.02 g (0.1 g in terms of solid amount) of an aqueous dispersion of a styrene/butadiene rubber having a weight-average molecular weight of 270,000 were stirred together for 5 minutes with a hybrid mixer manufactured by Keyence Corp. The resultant mixture was defoamed for 30 seconds to obtain a slurry.

This slurry was applied by the doctor blade method to a copper foil having a thickness of 18 µm as a current collector over a width of 5 cm so that the negative-electrode material adhered in an amount of 11.0±0.1 mg/cm$^2$. The coating was air-dried at room temperature. This coating was further dried at 110° C. for 30 minutes. Thereafter, the coated foil was pressed with rollers having a diameter of 20 cm while regulating the press so as to give an active-material layer having a density of 1.70 g/cm$^3$ to thereby obtain a negative-electrode sheet. In this roller pressing, the pressing load was measured.

(ii) Method of Fabricating Nonaqueous Secondary Battery

A platy piece of 4 cm×3 cm was punched out of the negative-electrode sheet produced by the method described above to thereby prepare a negative electrode. A positive electrode made of LiCoO$_2$ and having the same area was punched out so as to be used in combination with the negative electrode. Between the negative electrode and the positive electrode was disposed a separator (formed from porous polyethylene film) impregnated with an electrolytic solution obtained by dissolving LiPF$_6$ in a mixed solvent composed of ethylene carbonate, ethyl methyl carbonate, and dimethyl carbonate (volume ratio=25:37.5:37.5) in a concentration of 1 mol/L and further adding 2% by volume vinylene carbonate thereto as an additive. Thus, a laminate type battery was fabricated.

This nonaqueous secondary battery was examined for "cell swelling amount in high-temperature durability test" by the following determination method. The results obtained are shown in Table 1.

(iii) Method of Determining Cell Swelling Amount in High-Temperature Durability Test The laminate type battery fabricated by the method described above was allowed to stand for 12 hours, subsequently charged at a current density of 0.2 C mA/cm$^3$ until the potential difference between the electrodes reached 4.1 V, and then discharged at 0.2 C mA/cm$^3$ to 3 V. This operation was repeated twice. Furthermore, this battery was charged at the same current until the potential difference between the electrodes became 4.2 V. The amount of swelling a (mL) which had occurred until this point of time was measured by the immersion volumetric method (solvent displacement method based on Archimedes's principle). Thereafter, this battery was allowed to stand in an 85° C. thermostatic chamber for 3 days, and any additional amount of swelling b (mL) was determined. The value of "a+b (mL)" was taken as the "cell swelling amount in high-temperature durability test". The results given Table 1 were obtained by examining each of two such laminate type batteries and averaging the values obtained.

(iv) Method of Determining Charge/Discharge Irreversible Capacity in Initial Cycling and Charge/Discharge High-Load Characteristics A disk having a diameter of 12.5 mm was punched out of the negative-electrode sheet produced by the method described above to obtain a negative electrode. A disk having the same size was punched out of a lithium metal foil having a thickness of 0.5 mm and then press-bonded to a stainless-steel sheet to obtain a positive electrode. A two-electrode cell was fabricated. The cell was fabricated in a dry box regulated so as to have a water content of 20 ppm or lower. Between the negative electrode and the positive electrode was disposed a separator (formed from porous polyethylene film) impregnated with an electrolytic solution obtained by dissolving LiPF$_6$ in a mixed solvent composed of ethylene carbonate, ethyl methyl carbonate, and dimethyl carbonate (volume ratio=25:30:30) in a concentration of 1 mol/L.

A charge/discharge test was conducted under the conditions of discharge currents of 0.05 C (0.2 mA/cm$^2$), 1.0 C (4.0 mA/cm$^2$), and 2.0 C (8.0 mA/cm$^2$). The charge/discharge high-load characteristics are expressed by 100×[2.0 C (8.0 mA/cm$^2$)]/[0.05 C (0.2 mA/cm$^2$)]. The results of the charge/discharge test conducted by this method are shown in Table 1.

Example 2

Composite graphite particles were obtained in the same manner as in Example 1, except that the pulverization blade rotation speed was set at 6,000 rpm. These composite particles were examined for the properties in the same manners. Subsequently, in the same manners as in Example 1, an electrode plate (negative-electrode sheet) and a nonaqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 3

A graphite having an average particle diameter of 100 was subjected to a rounding treatment with Hybridization System Type NHS-3, manufactured by Nara Machinery Co., Ltd., at a rotor peripheral speed of 65 m/sec for 12 minutes to obtain spherical graphite particles having an average particle diameter of 13.7 µm. Composite graphite particles were obtained in the same manner as in Example 1, except that those spherical graphite particles and a binder pitch having a softening point of 88° C. as a graphitizable binder were used in a weight ratio of 100:30 and the pulverization blade rotation speed in the pulverization was changed to 6,000 rpm. The composite particles were examined for the properties in the same manners. Subsequently, in the same manners as in Example 1, an electrode plate (negative-electrode sheet) and a nonaqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 4

A graphite having an average particle diameter of 100 µm was subjected to a rounding treatment with Hybridization System Type NHS-3, manufactured by Nara Machinery Co., Ltd., at a rotor peripheral speed of 60 m/sec for 7 minutes to obtain spherical graphite particles having an average particle diameter of 17.3 µm. Composite graphite particles were obtained in the same manner as in Example 1, except that those spherical graphite particles and a binder pitch having a softening point of 88° C. as a graphitizable binder were used in a weight ratio of 100:30 and the pulverization blade rotation speed in the pulverization was changed to 6,000 rpm. The composite particles were examined for the properties in the same manners. Subsequently, in the same manners as in Example 1, an electrode plate (negative-electrode sheet) and a nonaqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 5

Composite graphite particles were obtained in the same manner as in Example 4, except that the pulverization blade rotation speed in the pulverization was set at 8,000 rpm. These composite particles were examined for the properties in the same manners. Subsequently, in the same manners as in Example 1, an electrode plate (negative-electrode sheet) and a nonaqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 6

A graphite having an average particle diameter of 100 μm was subjected to a rounding treatment with Hybridization System Type NHS-3, manufactured by Nara Machinery Co., Ltd., at a rotor peripheral speed of 60 m/sec for 9 minutes to obtain spherical graphite particles having an average particle diameter of 21.5 μm. The spherical particles were further pulverized with a jet mill to obtain spherical graphite particles in which surface primary particles of the spherical graphite particles had been randomly oriented in tangential-plane directions. These spherical particles were treated in the same manner as in Example 1 to obtain composite graphite particles. The composite particles were examined for the properties in the same manners. Subsequently, in the same manners as in Example 1, an electrode plate (negative-electrode sheet) and a nonaqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 7

The composite graphite particles produced in Example 5 were mixed with the spherical graphite particles produced in Example 1, in a proportion of 5/5. This mixture was examined for the properties in the same manners as in Example 1. Subsequently, in the same manners as in Example 1, an electrode plate (negative-electrode sheet) and a nonaqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 8

Using the composite graphite particles obtained in Example 1, an electrode plate (negative-electrode sheet) was produced in the same manner as in Example 1. The electrolytic solution described in Example 1 was sucked up with a microsyringe in an amount of 5 μL and then dropped from a height of 5 cm onto the electrode. Five 5-μL drops were thus put successively onto a longitudinal part of the electrode, and the time periods required for the electrolytic solution to disappear completely from the electrode surface were measured. The average of the measured values was determined. This average is hereinafter abbreviated to "electrolytic-solution disappearance time". The results of the determination of the electrolytic-solution disappearance time are shown in Table 1.

Example 9

Using the composite graphite particles obtained in Example 2, an electrode (negative-electrode sheet) was produced in the same manner as in Example 1. Using the electrolytic solution described in Example 1, this electrode was examined for electrolytic-solution disappearance time by the method described in Example 8. The results obtained are shown in Table 1.

Example 10

Using the composite graphite particles obtained in Example 3, an electrode (negative-electrode sheet) was produced in the same manner as in Example 1. Using the electrolytic solution described in Example 1, this electrode was examined for electrolytic-solution disappearance time by the method described in Example 8. The results obtained are shown in Table 1.

Example 11

Using the composite graphite particles obtained in Example 4, an electrode plate (negative-electrode sheet) was produced in the same manner as in Example 1. Using the electrolytic solution described in Example 1, this electrode was examined for electrolytic-solution disappearance time by the method described in Example 8. The results obtained are shown in Table 1.

Example 12

Using the composite graphite particles obtained in Example 5, an electrode (negative-electrode sheet) was produced in the same manner as in Example 1. Using the electrolytic solution described in Example 1, this electrode was examined for electrolytic-solution disappearance time by the method described in Example 8. The results obtained are shown in Table 1.

Example 13

Using the composite graphite particles obtained in Example 6, an electrode (negative-electrode sheet) was produced in the same manner as in Example 1. Using the electrolytic solution described in Example 1, this electrode plate was examined for electrolytic-solution disappearance time by the method described in Example 8. The results obtained are shown in Table 1.

Example 14

Composite graphite particles were obtained in the same manner as in Example 1, except that the pulverization blade rotation speed in the pulverization was changed to 2,000 rpm. These composite particles were examined for the properties in the same manners. Subsequently, in the same manners as in Example 1, an electrode (negative-electrode sheet) and a non-aqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 15

Composite graphite particles were obtained in the same manner as in Example 3, except that the pulverization blade rotation speed in the pulverization was changed to 2,000 rpm. These composite particles were examined for the properties in the same manners. Subsequently, in the same manners as in Example 1, an electrode (negative-electrode sheet) and a non-aqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 16

Composite graphite particles were obtained in the same manner as in Example 4, except that the pulverization blade rotation speed in the pulverization was changed to 2,500 rpm. These composite particles were examined for the properties in the same manners. Subsequently, in the same manners as in Example 1, an electrode (negative-electrode sheet) and a non-aqueous secondary battery were produced and the battery was examined for "cell swelling amount in high-temperature durability test", "charge/discharge irreversible capacity in initial cycling", and "charge/discharge high-load characteristics". The properties of the composite graphite particles and the results of these examinations are shown in Table 1.

Example 17

Using the composite graphite particles obtained in Example 14, an electrode (negative-electrode sheet) was produced in the same manner as in Example 1. Using the electrolytic solution described in Example 1, this electrode was examined for electrolytic-solution disappearance time by the method described in Example 8. The results obtained are shown in Table 1.

Example 18

Using the composite graphite particles obtained in Example 15, an electrode (negative-electrode sheet) was produced in the same manner as in Example 1. Using the electrolytic solution described in Example 1, this electrode was examined for electrolytic-solution disappearance time by the method described in Example 8. The results obtained are shown in Table 1.

Example 19

Using the composite graphite particles obtained in Example 16, an electrode (negative-electrode sheet) was produced in the same manner as in Example 1. Using the electrolytic solution described in Example 1, this electrode was examined for electrolytic-solution disappearance time by the method described in Example 8. The results obtained are shown in Table 1.

TABLE 1

| No. | Spherical graphite particle/binder pitch weight ratio | Pulverization blade rotation speed in pulverization (rpm) | Surface state | Median diameter ratio c (=a/b) | Raman R value | Median diameter μm | Tap density g/cm³ | BET specific surface area m²/g |
|---|---|---|---|---|---|---|---|---|
| Ex. 1 | 100:30 | 8000 | folded | 1.22 | 0.20 | 17.8 | 0.90 | 5.4 |
| Ex. 2 | 100:30 | 6000 | folded | 1.07 | 0.16 | 20.2 | 1.14 | 3.5 |
| Ex. 3 | 100:30 | 6000 | folded | 0.98 | 0.18 | 14.0 | 1.18 | 3.0 |
| Ex. 4 | 100:30 | 6000 | folded | 1.01 | 0.16 | 17.0 | 1.22 | 3.4 |
| Ex. 5 | 100:30 | 8000 | folded | 1.07 | 0.19 | 16.1 | 1.07 | 5.4 |
| Ex. 6 | 100:30 | — | folded | 0.94 | 0.15 | 22.0 | 1.10 | 2.7 |
| Ex. 7 | 100:30 | 8000 | folded | — | 0.22 | 18.9 | 1.10 | 4.9 |
| Ex. 14 | 100:30 | 2000 | smooth | 0.92 | 0.13 | 23.6 | 1.24 | 1.5 |
| Ex. 15 | 100:30 | 2000 | smooth | 0.86 | 0.12 | 16.0 | 1.15 | 2.3 |
| Ex. 16 | 100:30 | 2500 | smooth | 0.92 | 0.12 | 18.7 | 1.26 | 1.7 |

| No. | Average degree of circularity | Powder void amount mL/g | CO group amount μmol/m² | Cell swelling amount in high-temperature durability test mL | Charge/discharge irreversible capacity in initial cycling mAh/g | Charge/discharge high-load characteristics % | Electrolytic-solution disappearance time sec |
|---|---|---|---|---|---|---|---|
| Ex. 1 | 0.89 | 0.231 | 1.80 | 0.49 | 28 | 86 | 89 (Ex. 8) |
| Ex. 2 | 0.90 | 0.131 | 1.37 | 0.53 | 29 | 84 | 112 (Ex. 9) |
| Ex. 3 | 0.90 | 0.055 | — | 0.54 | 30 | 84 | 137 (Ex. 10) |
| Ex. 4 | 0.92 | 0.111 | 1.44 | 0.55 | 25 | 86 | 125 (Ex. 11) |
| Ex. 5 | 0.92 | 0.203 | — | 0.49 | 25 | 86 | 103 (Ex. 12) |
| Ex. 6 | 0.89 | 0.108 | — | 0.54 | — | — | 98 (Ex. 13) |
| Ex. 7 | 0.92 | 0.163 | — | 0.46 | 27 | 87 | — |

TABLE 1-continued

| Ex. 14 | 0.93 | 0.103 | 1.20 | 0.63 | 29 | 81 | 141 (Ex. 17) |
| Ex. 15 | 0.92 | 0.041 | — | 0.66 | 32 | 82 | 118 (Ex. 18) |
| Ex. 16 | 0.93 | 0.096 | — | 0.60 | 27 | 85 | 135 (Ex. 19) |

As apparent from the results given in Table 1, it was found that the batteries of Example 1 to Example 7 and the batteries of Example 14 to Example 16 were reduced in the cell swelling amount in high-temperature durability test and charge/discharge irreversible capacity in initial cycling and were high in charge/discharge high-load characteristics.

In Example 8 to Example 13 and in Example 17 to Example 19, the electrolytic-solution disappearance times were found to be exceedingly short.

INDUSTRIAL APPLICABILITY

By using the composite graphite particles of the invention, an excellent negative electrode for nonaqueous secondary batteries can be stably and efficiently produced which gives a nonaqueous secondary battery reduced in charge/discharge irreversible capacity in initial cycling. The composite graphite particles further enable the stable and efficient production of nonaqueous secondary batteries. Consequently, the invention is industrially exceedingly useful in the field of various nonaqueous secondary batteries.

This application is based on Patent Application No. 2006-348703, which is a Japanese patent application filed on Dec. 26, 2006, the entire contents thereof being herein incorporated by reference into the disclosure of the description of the invention.

The invention claimed is:

1. Composite graphite particles comprising a composite of spherical natural graphite particles and a graphitized product of a graphitizable binder, wherein the composite graphite particles have CO groups present on a surface normalized with a BET specific surface area of from 1.35 µmol/m² to 5 µmol/m² and an average degree of circularity of from 0.85 to 0.95.

2. The composite graphite particles according to claim 1, wherein the spherical graphite particles comprises a scale-like or squamous and curved or bent graphite.

3. The composite graphite particles according to claim 1, wherein the particles are obtained by pulverizing or grinding a graphitized product.

4. The composite graphite particles according to claim 1, wherein the composite graphite particles comprise composite graphite particles which have an imperfect laminate structure of the spherical graphite particles near the surface thereof.

5. The composite graphite particles according to claim 1, wherein when the median diameter of the spherical graphite particles and the median diameter of the composite graphite particles are expressed by a and b, respectively, then the ratio c=a/b is 0.93 or larger.

6. The composite graphite particles according to claim 1, wherein the composite graphite particles have a Raman R value of from 0.10 to 0.30, an average degree of circularity of 0.85 or higher, a tap density of from 0.87 g/cm³ to 1.25 g/cm³, and a BET specific surface area of from 2.5 m²/g to 8.0 m²/g.

7. The composite graphite particles according to claim 1, wherein a volume of pores ranging from 0.01 µm to 2 µm, as measured with a mercury porosimeter, is from 0.05 mL/g to 1 mL/g.

8. The composite graphite according to claim 1, wherein when an electrode is produced by preparing a slurry using the composite graphite particles under following condition (i), subsequently applying the slurry to a rolled copper foil by a doctor blade method, drying the coating, and then pressing the dried coating so as to result in an active-material layer density of 1.70 g/cm³, and 5-µL drops of an electrolytic solution having following composition (ii) are put from a height of 5 cm onto a longitudinal central part in the electrode, then the average time period required for the electrolytic solution to disappear completely from the electrode surface is 180 seconds or shorter, wherein (i) Slurry Preparation Condition
A 20.00±0.02 g of the composite graphite particles, 20.00±0.02 g of 1% by mass aqueous carboxymethyl cellulose (CMC) solution, and 0.25±0.02 g of an aqueous styrene/butadiene rubber (SBR) dispersion are weighed out and manually stirred, and the resultant mixture is stirred with a planetary rotary mixer (hybrid mixer) for 5 minutes and defoamed for 30 seconds to prepare the slurry, and (ii) Composition of Electrolytic Solution
$LiPF_6$ is incorporated in a concentration of 1.0 M into a mixed solvent comprising ethylene carbonate (EC), ethyl methyl carbonate (EMC), and dimethyl carbonate (DMC) (volume ratio=2:2:3), and 2% by volume of vinylene carbonate is further added thereto.

9. A negative-electrode material, comprising the composite graphite particles for a nonaqueous secondary battery according to claim 1.

10. The negative-electrode material for a nonaqueous secondary battery according to claim 9, further comprising carbonaceous particles differing in shape or property from the composite graphite particles.

11. The negative-electrode material according to claim 10, wherein the carbonaceous particles have an average degree of circularity of 0.88 or higher.

12. A negative electrode for a nonaqueous secondary battery, comprising a current collector and an active-material layer formed thereon, wherein the active-material layer is formed by using the negative-electrode material for a nonaqueous secondary battery according to claim 9.

13. A nonaqueous secondary battery comprising a positive electrode capable of occluding/releasing lithium ions, a negative electrode capable of occluding/releasing lithium ions, and an electrolyte, wherein the negative electrode is the negative electrode for a nonaqueous secondary battery according to claim 12.

14. Composite graphite particles which are obtained by a process comprising kneading spherical natural graphite particles together with a graphitizable binder and then graphitizing the mixture, wherein the composite graphite particles have CO groups present on a surface normalized with a BET specific surface area of from 1.35 µmol/m² to 5 µmol/m² and an average degree of circularity of from 0.85 to 0.95.

15. The composite graphite according to claim 14, wherein the spherical graphite particles comprises a scale-like or squamous and curved or bent graphite.

16. The composite graphite particles according to claim 14, wherein the composite graphite particles are obtained by pulverizing or grinding a graphitized product.

17. The composite graphite particles according to claim 14, wherein the composite graphite particles comprise composite graphite particles which have an imperfect laminate structure of the spherical graphite particles near the surface thereof.

18. The composite graphite particles according to claim 14, wherein when the median diameter of the spherical graphite particles and the median diameter of the composite graphite particles are expressed by a and b, respectively, then the ratio c=a/b is 0.93 or larger.

19. The composite graphite particles according to claim 14, wherein the composite graphite particles have a Raman R value of from 0.10 to 0.30, an average degree of circularity of 0.85 or higher, a tap density of from 0.87 g/cm$^3$ to 1.25 g/cm$^3$, and a BET specific surface area of from 2.5 m$^2$/g to 8.0 m$^2$/g.

20. The composite graphite particles according to claim 14, wherein a volume of pores ranging from 0.01 μm to 2 μm, as measured with a mercury porosimeter, is from 0.05 mL/g to 1 mL/g.

21. The composite graphite particles according to claim 14, wherein when an electrode is produced by preparing a slurry using the composite graphite particles under following condition (i), subsequently applying the slurry to a rolled copper foil by a doctor blade method, drying the coating, and then pressing the dried coating so as to result in an active-material layer density of 1.70 g/cm$^3$, and 5-μL drops of an electrolytic solution having following composition (ii) are put from a height of 5 cm onto a longitudinal central part in the electrode, then the average time period required for the electrolytic solution to disappear completely from the electrode surface is 180 seconds or shorter, wherein
   (i) Slurry Preparation Condition
   A 20.00±0.02 g of the composite graphite particles, 20.00±0.02 g of 1% by mass aqueous carboxymethyl cellulose (CMC) solution, and 0.25±0.02 g of an aqueous styrene/butadiene rubber (SBR) dispersion are weighed out and manually stirred, and the resultant mixture is stirred with a planetary rotary mixer (hybrid mixer) for 5 minutes and defoamed for 30 seconds to prepare the slurry, and
   (ii) Composition of Electrolytic Solution
   LiPF$_6$ is incorporated in a concentration of 1.0 M into a mixed solvent comprising ethylene carbonate (EC), ethyl methyl carbonate (EMC), and dimethyl carbonate (DMC) (volume ratio=2:2:3), and 2% by volume of vinylene carbonate is further added thereto.

22. A negative-electrode material for a nonaqueous secondary battery, which comprises the composite graphite particles according to claim 14.

23. The negative-electrode material for a nonaqueous secondary battery according to claim 22, which further comprises carbonaceous particles differing in shape or property from the composite graphite particles.

24. The negative-electrode material according to claim 23, wherein the carbonaceous particles have an average degree of circularity of 0.88 or higher.

25. A negative electrode for a nonaqueous secondary battery, which comprises a current collector and an active-material layer formed thereon, wherein the active-material layer is formed by using the negative-electrode material for a nonaqueous secondary battery according to claim 22.

26. A nonaqueous secondary battery which comprises a positive electrode capable of occluding/releasing lithium ions, a negative electrode capable of occluding/releasing lithium ions, and an electrolyte, wherein the negative electrode is the negative electrode for a nonaqueous secondary battery according to claim 25.

* * * * *